United States Patent

Sakashita et al.

Patent Number: 5,785,910
Date of Patent: Jul. 28, 1998

[54] METHOD FOR MANUFACTURING LAMINATE-MOLDED PRODUCTS AND APPARATUS THEREFOR

[75] Inventors: Katsutoshi Sakashita, Kawasaki; Tetsuzi Funahashi, Yuhki; Akira Yokota, Odawara; Masayuki Oishi, Hiratsuka, all of Japan

[73] Assignee: Kabushiki Kaisha Komatsu Seisakusho, Tokyo, Japan

[21] Appl. No.: 545,644

[22] PCT Filed: Apr. 28, 1994

[86] PCT No.: PCT/JP94/00733

§ 371 Date: Oct. 30, 1995

§ 102(e) Date: Oct. 30, 1995

[87] PCT Pub. No.: WO94/25244

PCT Pub. Date: Nov. 10, 1994

[30] Foreign Application Priority Data

Apr. 30, 1993 [JP] Japan ................................. 5-128043
Jun. 23, 1993 [JP] Japan ................................. 5-174643

[51] Int. Cl.[6] .................... B29C 44/06; B29C 55/02; B29C 45/16
[52] U.S. Cl. .................. 264/45.5; 264/46.4; 264/54; 264/257; 264/259; 264/291; 264/292; 264/404; 264/442; 425/111; 425/112; 425/145; 425/150; 425/567
[58] Field of Search ................ 264/46.4, 45.5, 264/54, 291, 328.7, 40.5, 259, 255, 257, 292, 404, 442; 425/567, 111, 112, 149, 150, 145

[56] References Cited

U.S. PATENT DOCUMENTS

| | | | |
|---|---|---|---|
| 3,852,389 | 12/1974 | Adler et al. | 264/46.4 |
| 4,075,266 | 2/1978 | Theysohn | 264/259 |
| 4,096,218 | 6/1978 | Yasuike et al. | 264/328.7 |
| 4,123,494 | 10/1978 | Evrard et al. | 264/328.7 |
| 4,131,596 | 12/1978 | Allen | 425/149 |
| 4,216,184 | 8/1980 | Thomas | 264/259 |
| 4,794,750 | 1/1989 | Schmidt et al. | 264/259 |
| 5,049,327 | 9/1991 | Hara et al. | 264/45.5 |
| 5,052,910 | 10/1991 | Hehl | 425/150 |
| 5,062,784 | 11/1991 | Inaba et al. | 425/149 |
| 5,096,652 | 3/1992 | Uchiyama et al. | 264/259 |
| 5,183,605 | 2/1993 | Brown et al. | 425/149 |
| 5,251,146 | 10/1993 | Neko et al. | 425/149 |
| 5,281,376 | 1/1994 | Hara et al. | 264/46.4 |
| 5,376,324 | 12/1994 | Kim | 264/259 |
| 5,552,094 | 9/1996 | Kubota | 264/328.7 |

FOREIGN PATENT DOCUMENTS

| | | | |
|---|---|---|---|
| 55-156037 | 12/1980 | Japan | 264/46.4 |
| 60-124239 | 7/1985 | Japan . | |
| 60-38250 | 8/1985 | Japan . | |
| 63-66651 | 12/1988 | Japan . | |
| 1-165414 | 6/1989 | Japan . | |
| 2-301413 | 12/1990 | Japan . | |
| 4-138231 | 5/1992 | Japan . | |
| 2038703 | 7/1980 | United Kingdom | 264/46.4 |

*Primary Examiner*—Allan R. Kuhns
*Attorney, Agent, or Firm*—Sidley & Austin

[57] ABSTRACT

The present invention is to improve a laminate molding method and a laminate-molding apparatus for manufacturing molded products that have an external appearance of excellent quality. For this purpose, according to a molding method, by which a mold clamping device (3) laminates sheet of skin material (Mm) and a core resin (200), the tension of the sheet of skin material Mm, which is inserted into a cavity (9) between a clamped fixed metal mold (11) and a clamped movable metal mold (12) and is laminated by the movable metal mold (12), is varied, continuously or in a stepped manner, in consonance with the insertion amount of the sheet of skin material (Mm). The laminate-molding apparatus comprises a skin material holding device (40) that is attached to the mold clamping device (3), a detector (31) that detects a stroke or a time at the time of clamping the movable metal mold (21), and a skin material holding controller (50) that, upon the receipt of a detection signal, outputs to the skin material holding device (40) a command for altering the tension of the sheet of skin material.

29 Claims, 16 Drawing Sheets

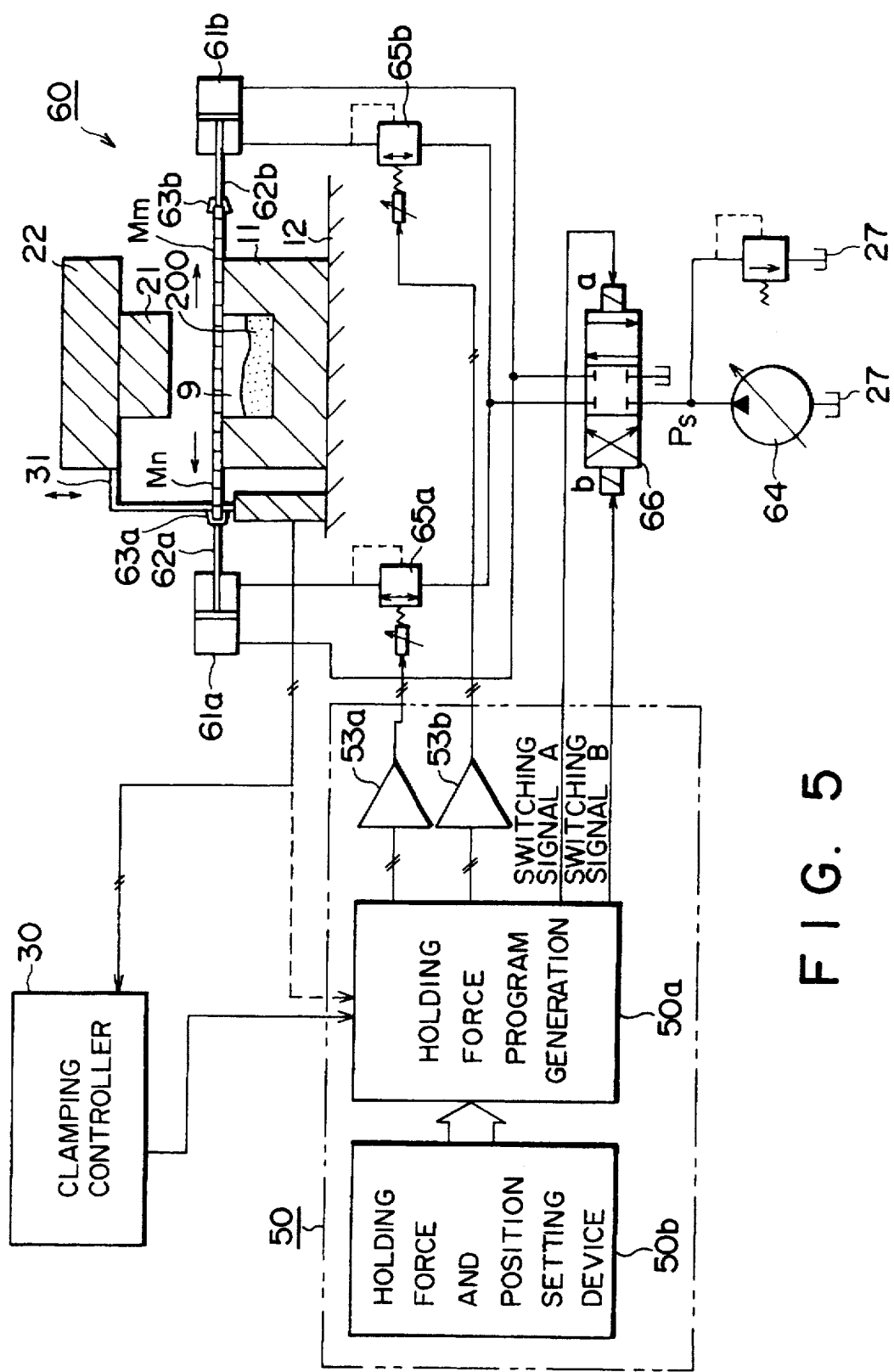
F I G. 5

METHOD FOR MANUFACTURING LAMINATE-MOLDED PRODUCTS AND APPARATUS THEREFOR

FIELD OF THE INVENTION

The present invention relates to a method and an apparatus for manufacturing laminate-molded products, and in particular to a method and an apparatus for manufacturing laminate molded products having an external appearance of an excellent quality.

BACKGROUND OF THE INVENTION

A conventional method for manufacturing laminate-molded products is, for example, a method disclosed in Japanese Examined Patent Publication (B2) 63-66651. With this method, the edge of a sheet of skin material is sandwiched by a specific holding force between a fixed frame, which is provided on the side of a metal mold, and a fixed metal mold (a female metal mold); then the fixed metal mold is shifted so that it is close to a movable metal mold (a male metal mold). Thereafter, the edge of the sheet of skin material is slipped between the fixed frame and the fixed metal mold, and the sheet of skin material is drawn into the cavity of the fixed metal mold.

However, since, with this method, the clamping is performed when the edge of the sheet of skin material is held by the specific holding force, and the sheet of skin material is drawn into the metal mold while sliding against the fixed frame and against the female metal mold, the sheet of skin material will be torn when the holding force is too large and puckering of the sheet of skin material will occur when the holding force is too small.

Even with a holding force in the appropriate range, the tension that acts on the sheet of skin material and the deformation that is due to tension are not uniform when manufacturing deep-drawn products and products that have complicated shapes. If the holding force during the pressing procedure is constant, partial tearing and damage or puckering will occur, and will result in the deterioration of the external appearance and the quality of products.

There are further methods, including a method in which a sheet of skin material is placed into a metal mold and a melted thermoplastic resin is injected through a nozzle into the mold cavity and solidified so as to laminate the sheet of skin material and the resin (see Japanese Patent Publication (B2) 60-38250), and another method in which an adhesive is used to laminate a sheet of skin material onto a foamed body that is manufactured by a conventional foaming molding method (see Japanese Unexamined Patent Publication (A) 60-124239).

However, as these methods also require the application of a high pressure during a cooling procedure that is performed after the injection process in order to prevent sink marks, etc., on the surface of the resin, the sheet of skin material that is pressed strongly against the metal mold may have a poor surface quality due to the deformation of the pattern, and melted resin may permeate the sheet of skin material and thus substantially reduce the value of the product. Although even large molded products can be manufactured so that they are lightweight when the resin substrate is a foamed body, the lamination of the sheet of skin material is difficult and complicated, and the strength of the adhesive bond that is provided tends to be insufficient.

DISCLOSURE OF THE INVENTION

In order to overcome the above shortcomings, it is one object of the present invention to provide a method and an apparatus for manufacturing lightweight laminate-molded products having an external appearance that has an excellent quality.

A laminate-molding method, for manufacturing molded products, in which an injection device, a mold clamping device, and a fixed metal mold and a movable metal mold, that are attached to the mold clamping device, are employed to laminate a sheet of skin material, such as a woven fabric, a nonwoven fabric, a thermoplastic resin or a thermoplastic elastomer sheet or film, and a core resin, comprises a step of varying, continuously or by degrees, the tension on the sheet of skin material which is inserted into a cavity between the fixed metal mold and the movable metal mold of the mold clamping device and which is laminated by the movable metal mold in consonance with the insertion quantity of the sheet of skin material. The sheet of skin material can be slid in the direction of the fixed metal mold at a predetermined speed that is in consonance with the speed at which the sheet of skin material is inserted, and the sheet of skin material is held at two or more points outwardly of the location whereat the sheet of skin material is driven into the fixed metal mold by the movable metal mold, so that the tensions on the sheet of skin material at the points either are matched or are not matched.

Further, the fixed metal mold and the movable metal mold are clamped together while the sheet of skin material is sandwiched therebetween; and a core resin, that is mixed with a foaming agent, is melted in a non-foamed state by heating in a cylinder of the injection device. Then, the melted resin is heated between the cylinder and the metal molds for the thermal decomposition of the foaming agent, and the melted resin in the foaming start state is injected into the cavity between the metal molds and is solidified by cooling, so that the sheet of skin material and the core resin are laminated. Thereafter, the core resin, with which the foaming agent is mixed, is heated by the cylinder of the injection device to provide a melted resin in the non-foamed state. Then, heating between the cylinder and the metal molds is controlled in multiple steps, thermal decomposition is performed during at least one step out of the multiple steps to activate the foaming agent, and the melted resin, either in the foaming start state or in the non-foaming state, is injected into the cavity between the metal molds in the multiple steps and is solidified by cooling, so that the sheet of skin material and the core resin are laminated. For heating in the cylinder and between the metal molds, at least one of means for shear heat generation, means for electric resistance heating, and means for ultrasonic heating, is employed. For heating that is accomplished by shear heat generation, the melted resin flow path in a nozzle portion of the cylinder can be provided with a fixed flow restriction or a rotary valve.

A laminate-molding apparatus for manufacturing molded products, which employs an injection device, a mold clamping device, and a fixed metal mold and a movable metal mold, that are attached to the clamping device, to laminate a sheet of skin material, such as a woven fabric, a nonwoven fabric, a thermoplastic resin or thermoplastic elastomer sheet or film, and a core resin, comprises: a skin material holding unit, which is attached to the mold clamping device, for providing tension for the sheet of skin material; a detector for detecting a stroke or a time when the movable die plate or the movable metal mold of the mold clamping device is clamped; and a skin material holding controller for, upon the receipt of a signal from the detector, outputting to the skin material holding unit a command to change a tension that is applied to the sheet of skin material. In another embodiment, a laminate-molding apparatus comprises: a skin material holding and feeding unit, which is attached to the mold clamping device, for providing tension that is applied to the sheet of skin material and for feeding the sheet of skin material toward the fixed metal mold at a predetermined speed that is consonant with a speed at which the sheet of skin material is inserted; a detector for detecting a stroke or a time when the movable die plate or the movable metal mold of the mold clamping device is clamped; and a skin material holding controller for, upon receipt of a signal from the detector, outputting to the skin material holding and feeding unit a command to change the tension that is applied to the sheet of skin material and a feeding speed command. A holding element of the skin material holding unit can be formed as an integral frame at the edges of the sheet of skin material. A holding element of the skin material holding unit or the skin material holding and feeding unit can be provided on at least one of a plurality of facing edge portions of the sheet of skin material. The skin material holding controller independently controls a plurality of holding elements of the skin material holding unit, or independently controls a plurality of holding elements of the skin material holding and feeding unit. The holding elements of the skin material unit or the skin material holding and feeding unit provide tension for the sheet of skin material by exerting a compression force on both surfaces of the sheet of skin material. The holding elements of the skin material holding unit or the skin material holding and feeding unit can apply tension to the sheet of skin material by directly holding the sheet of skin material. The holding elements of the skin material holding and feeding unit feed the sheet of skin material at a predetermined speed by exerting the compression force on at least one surface of the sheet of skin material.

In order to laminate the sheet of skin material and the core resin with this arrangement, a variable direct tension or a variable tension, that is provided by a holding force (a compression force) that presses the sheet of skin material, is applied to the sheet of skin material in consonance with the stroke or the time at which the die plate or the movable metal mold is clamped. At this time, a variable feeding distance is also given to the sheet of skin material in a direction in which the movable metal mold is clamped. Since the tension of the sheet of skin material or the feeding distance of the sheet of skin material are both independent, or are both variable, when the clamping is performed to insert the sheet of skin material into the metal molds, slippage is reduced between the sheet of skin material and the fixed frame and between the sheet of skin material and the female metal mold. Therefore, tearing or puckering of the sheet of skin material will not occur. Even for the molding of deep-drawn products or of products that have a complicated shape, the tension that acts on the sheet of skin material and the deformation that is due to this are almost uniform, so that the occurrence of partial tearing or damage and of puckering can be prevented, and the quality of the external appearance can be improved.

In addition, since resin that contains a foaming agent can be heated in the cylinder to a temperature that is equal to or higher than its melting point, and that is equal to or lower than a temperature for the thermal decomposition of the foaming agent, there is no change in volume and flowability due to foaming, and the resin flows toward the nozzle portion while maintaining a favorable flowability. When the resin is heated between the cylinder and the metal molds, for example, at the nozzle portion, the temperature can be increased to or is higher than the thermal decomposition of the foaming agent. While the thermal decomposition may begin, depending on the type of foaming agent, and the foaming may begin, although only in a tiny quantity, almost all of the melted resin is substantially in the non-foamed state. Then, the melted resin is injected through the gate between the metal molds and fills in the cavity. When the resin contacts the metal molds, or the thin sheet of skin material that lies between them, it is quickly cooled, and a skin layer is formed by the non-foamed resin or the partially foamed resin. The melted resin in the cavity that has not been cooled is foamed to provide a core. At this time, since the skin layer is pressed against the internal walls of the metal molds or the internal face of the sheet of skin material by the foaming pressure in the core, sink marks, etc., do not appear, and the degradation of the quality, as from deformation of or color changes on the surface of the sheet of skin material, does not occur. The laminate-molded product is preferably provided by bonding together the sheet of skin material and the core resin, the latter consisting of the skin layer, which has a high quality surface and sufficient strength, and the lightweight core.

The heating in the cylinder and between the metal molds is a multiple-step heating control process during which, in at least one step, heating is performed at a temperature that is equal to or higher than the thermal decomposition temperature for the foaming agent and in the other steps, either heating is performed at a temperature that is equal to or lower than the thermal decomposition temperature, or no heating is performed. An explanation will be now given for a case wherein, with the heating being controlled in three steps, heating is performed in the second step at a temperature that is equal to or higher than the temperature for the thermal decomposition of the foaming agent, and wherein the heating means is a rotary valve, which is a resin flow path resist element that is provided in the nozzle portion and which causes shear heat generation. The melted resin is controlled in the cylinder at a predetermined temperature, which is equal to or higher than the melting point of the resin and equal to or lower than the temperature for the thermal decomposition of the foaming agent. In the first step, the resin injected into the cavity is in the non-foamed state, since the heat due to shearing when the resin passes through the rotary valve is adjusted to be low. In the second step, the resin is heated so that the temperature due to shear heat generation when the resin passes through the rotary valve is equal to or higher than the temperature for the thermal decomposition of the foaming agent, and the resin is injected into the cavity in the foaming start state. In the third step, the melted resin is injected into the cavity in the non-foamed state. As for a laminate-molded product that is acquired in three steps by heating the resin and injecting it, and employing it for filling, the sheet of skin material and the core resin provide a high quality skin layer, which has a predetermined thickness and a sufficient strength and that has no sink marks on its surface, and a lightweight core.

The temperature rise $\Delta T$ of the melted resin that is due to shear heat generation is normally defined as follows. When the pressure loss in the flow path resist element is denoted by $\Delta P$, the viscosity of the melted resin is denoted by $\eta$, the stress concentration factor of the flow path resist element is denoted by $r$, the injection pressure of an injection molding machine is denoted by $Pi$, and the injection speed of the injection molding machine is denoted by $Vi$, $$\Delta T \propto \Delta P = f(\eta, r, Pi, Vi).$$

It is therefore apparent that the temperature rise of the melted resin that is due to shear heat generation is proportional to the pressure loss in the flow path resist element, and that the pressure loss is determined by the viscosity of the melted resin, the stress concentration factor of the flow path resist element, and the injection pressure and the injection speed of the injection molding machine. The control of the amount of heat generated by shear, i.e., the control for heating, can be performed by adjusting the flow path area in the flow path resist element that is provided between the cylinder and the metal molds at the nozzle portion, for example, or by adjusting the injection output and injection speed when the melted resin is injected into the cavity. The selection of a pressure at which the quality of the surface of the sheet of skin material is not deteriorated is required for the adjustment of the injection pressure.

BRIEF DESCRIPTION OF THE DRAWINGS

FIG. 5 is a diagram for explaining an injection molding machine and a laminate-molding apparatus according to a second embodiment of the present invention;

BEST MODES FOR CARRYING OUT THE INVENTION

A first embodiment of the present invention will now be described in detail while referring to FIGS. 1 through 4.

Figure 1:
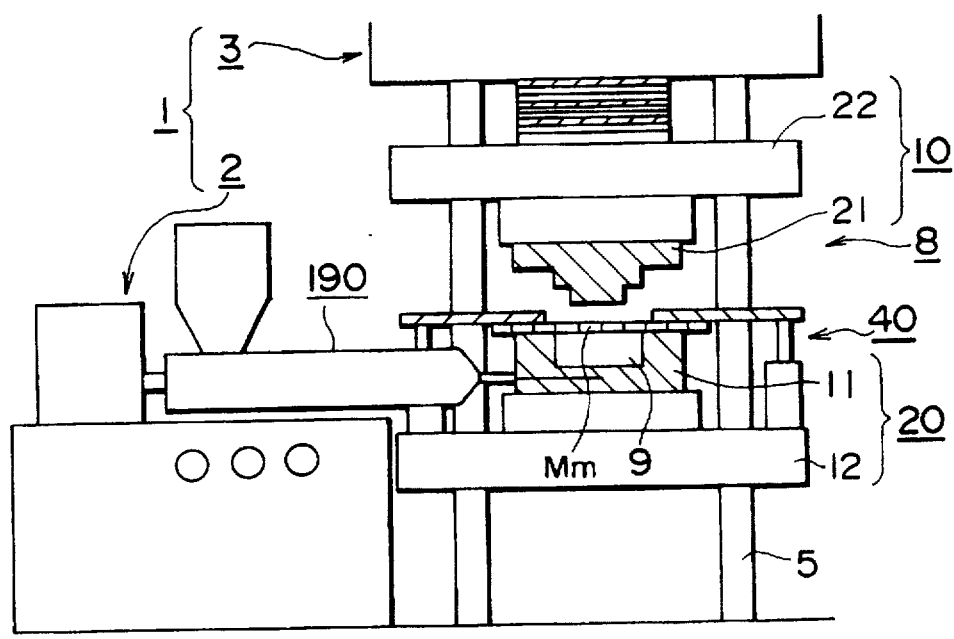
FIG. 1 is a diagram illustrating the external appearance of an injection and compression molding machine and a laminate-molding apparatus, both according to a first embodiment of the present invention.
Figure 2:
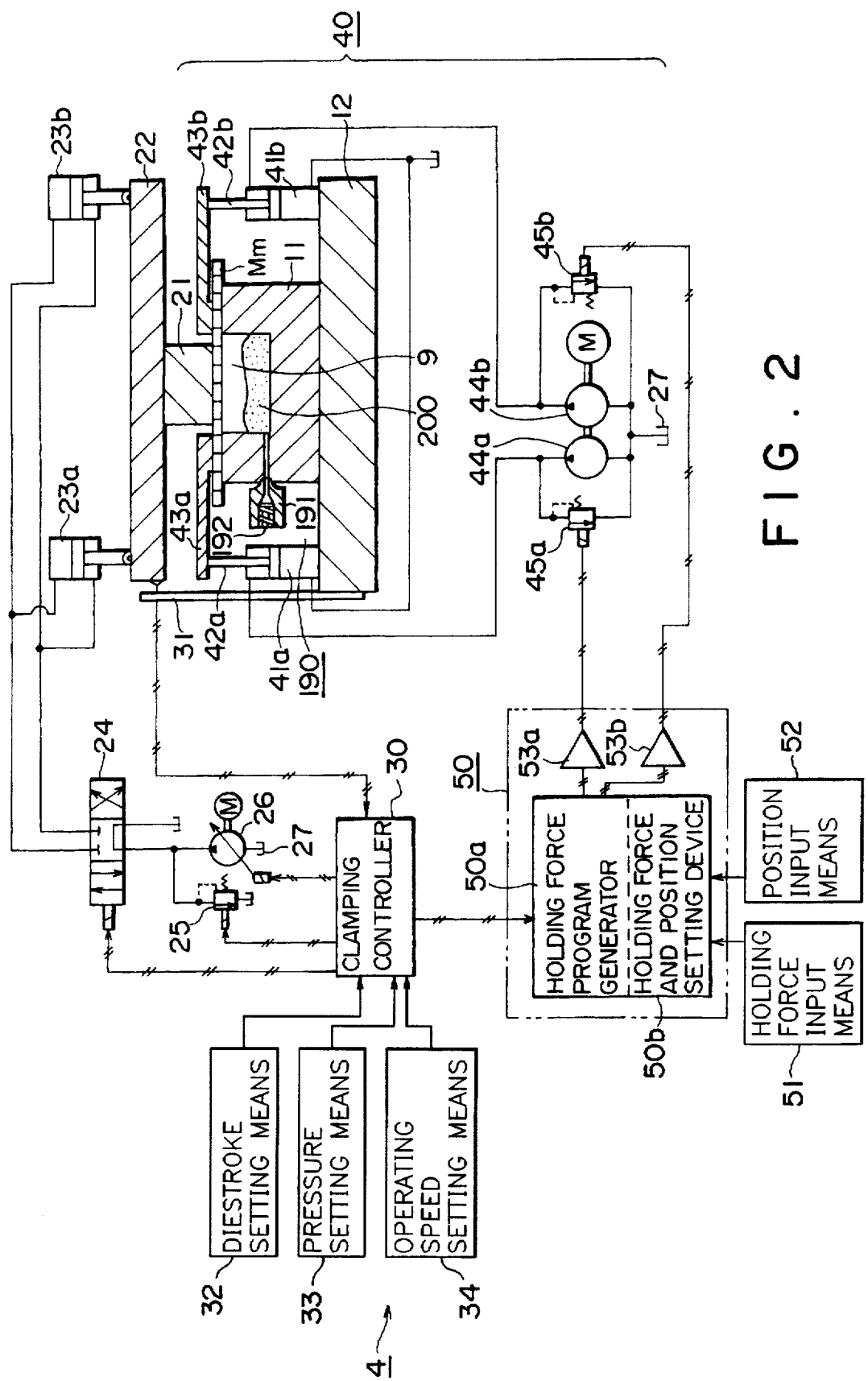
FIG. 2 is a diagram for explaining the injection and compression molding machine and the laminate molding apparatus according to the first embodiment of the present invention.

In FIGS. 1 and 2, an injection and compression molding machine 1 includes an injection device 2, a mold clamping device 3, and a controller 4. A laminate-molding apparatus 8 includes a skin material holding device 40 and a skin material holding controller 50.

An injection cylinder device 190, that injects plastic material into the mold clamping device 3, is provided for the injection device 2, and is attached by a slide cylinder (not shown), which is fixed to a heating cylinder 191, so as to be slidable toward a fixed metal mold 11. A screw 192 is snugly inserted into the heating cylinder 191, and as the screw 192 is driven by a hydraulic cylinder (not shown) and slides toward the metal molds, plastic material is injected.

The mold clamping device 3 includes support rods 5, a fixed die plate unit 20, and a movable die plate unit 10. The fixed die plate unit 20 is fixed to the middle of the support rods 5. The fixed die plate unit 20 has a fixed metal mold 11 that is mounted on a fixed die plate 12.

The movable die plate unit 10, which is attached to the support rods 5, has a movable metal mold 21 and a movable die plate 22 that supports the movable metal mold 21 and that slides freely along the support rods 5. The components of the movable die plate unit 10 include clamping cylinders 23a and 23b, which press the movable die plate 22 toward the fixed die plate 12 at the time of clamping; solenoid operated directional control valve 24, which is operated by a command from the controller 4 to supply hydraulic oil to the clamping cylinders 23a and 23b; solenoid pressure proportion valve 25, which adjusts the force of the pressure that is applied to the resin; a variable pump 26, which serves as a hydraulic oil supply source; and an oil tank 27.

The controller 4 includes a mold clamping controller 30, which controls both a mold clamping procedure and an injection procedure; a position sensor 31, which is disposed between the movable die plate 22 and the fixed die plate 12, and which detects the position of the movable metal mold 21 relative to the fixed metal mold 11; a die stroke setting means 32 for inputting the altered position of the operating speed of the movable metal mold 21, which is set in consonance with the type of sheet of skin material Mm and the shape of a product; a pressure setting means 33 for setting a pressure, an altered position, and a pressure time; and an operating speed setting means 34, for setting the operating speed of the movable metal mold 21, i.e., the discharge volume of the pump 26.

The mold clamping controller 30 stores a command that is received from the die stroke setting means 32, the pressure setting means 33, or the operating speed setting means 34. Further, upon the receipt of the signal from the position sensor 31, the mold clamping controller 30 outputs a command to the variable pump 26, the solenoid operated directional control valve 24, and the solenoid operated pressure proportional valve 25, and also outputs a signal to the skin material holding controller 50, which will be described later.

The skin material holding device 40 includes cylinders 41a and 41b, which are provided on the fixed plate 12 of the mold clamping device 3; holding members 43a and 43b, which are coupled with rods 42a and 42b of the cylinders 41a and 41b, to hold the edges of the sheet of skin material Mm; pumps 44a and 44b, which supply pressure to the cylinders 41a and 41b; solenoid operated pressure proportion valves 45a and 45b, which set the pressure that is exerted on the fluid that is driven by the pumps 44a and 44b, and which control the strength of the holding force that is applied to the sheet of skin material Mm; and an oil tank 27.

The skin material holding controller 50 is constituted by a holding force program generator 50a; a device 50b (hereafter referred to as a "holding force and position setting device"), for setting a variable strength for the holding force, that is applied to the sheet of skin material Mm, and an altered position and an altered time for the holding force; amplifiers 53a and 53b for amplifying a command output; holding force input means 51 for inputting data for a holding force; and position input means 52 for inputting data for a die stroke. The skin material holding controller 50 receives a command from the mold clamping controller 30 and a signal from the holding force and position setting device 50b, which sets the strength of the holding force that is applied to the sheet of skin material Mm, and outputs a command from its holding force program generator 50a to the solenoid operated pressure proportion valves 45a and 45b through the amplifiers 53a and 53b.

The operation in this embodiment will now be explained. First, in consonance with the type of sheet of skin material Mm, its size, its thickness, and its drawability property for the required shape of a product, the operating speed V of the movable metal mold 21 during the pressing procedure is inputted to the mold clamping controller 30 by an operating speed setting means 34; the altered position Y, or the time t for the operating speed, is inputted by a die stroke setting means 32; and during the pressurizing procedure the pressure $P_p$ is inputted by a pressure setting means 33. At this time, the relationship between the operating speed, the altered position of the movable metal mold 21, and the injection quantity of the injection cylinder device 190 is also inputted to the mold clamping controller 30. In addition, a signal from the position sensor 31 is inputted to the mold clamping controller 30.

Likewise, the holding force P for the sheet of skin material, that corresponds to the shape of the product, is inputted by the holding force setting means 51 to the holding force and position setting device 50b; and the altered position y for the holding force is inputted by the holding position setting means 52. In the above described pressing procedure example, the altered position Y for the operating speed matches the altered position y for the holding force.

Figure 3:
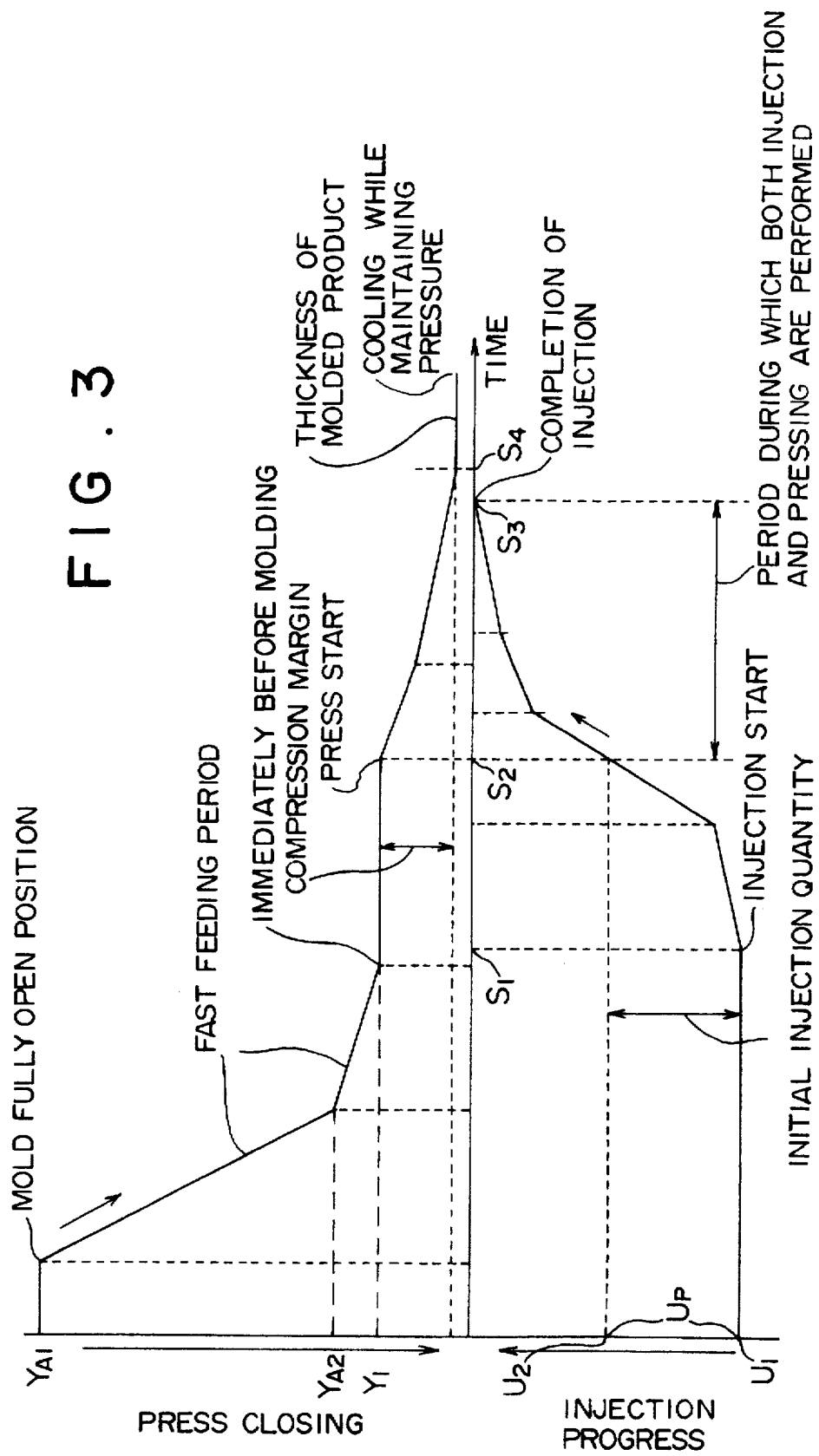
FIG. 3 is a time chart of the movable die plate when plastic material is injected and compressed for molding according to the first embodiment of the present invention.

The relationship between the injection of plastic material 200 from the injection cylinder device 190 and the movement of the movable die plate 22 during the injection and compression molding will be explained while referring to FIG. 3.

The movable die plate 22 is shifted at a high speed from the mold fully open position $Y_{A1}$ to the predetermined position $Y_{A2}$, and is then moved at a lower speed to the predetermined position $Y_1$ and halted there. At this position, the movable metal mold 21 and the fixed metal mold 11 are open, and the movable metal mold 12 is positioned near the sheet of skin material Mm, although, preferably, not in contact with it. At the position $Y_1$, the screw 192 is driven to expel an initial amount ($U_p = U_1 - U_2$) of the plastic material 200 from the injection cylinder device 190 and to inject it into a cavity 9 that is located between the fixed metal mold 11 and the sheet of skin material Mm, while the injection flow rate is changed from time $S_1$ to time $S_2$. When the injection of the initial amount $U_p$ of the plastic material 200 is detected by a position sensor (not shown) that is provided in the injection cylinder device 190, the movable die plate 22 is moved and the press closing procedure begins. As the closing procedure is performed at the set operating speed V of the movable metal mold 21, the plastic material 200 is sequentially expelled from the injection cylinder device 190 and injected at a predetermined injection flow rate, with the injection being terminated at the time $S_3$, which is earlier than the time $S_4$, at which the closing of the metal molds is completed. At time $S_4$ and thereafter, a pressure maintaining procedure is begun and continued.

Figure 4:
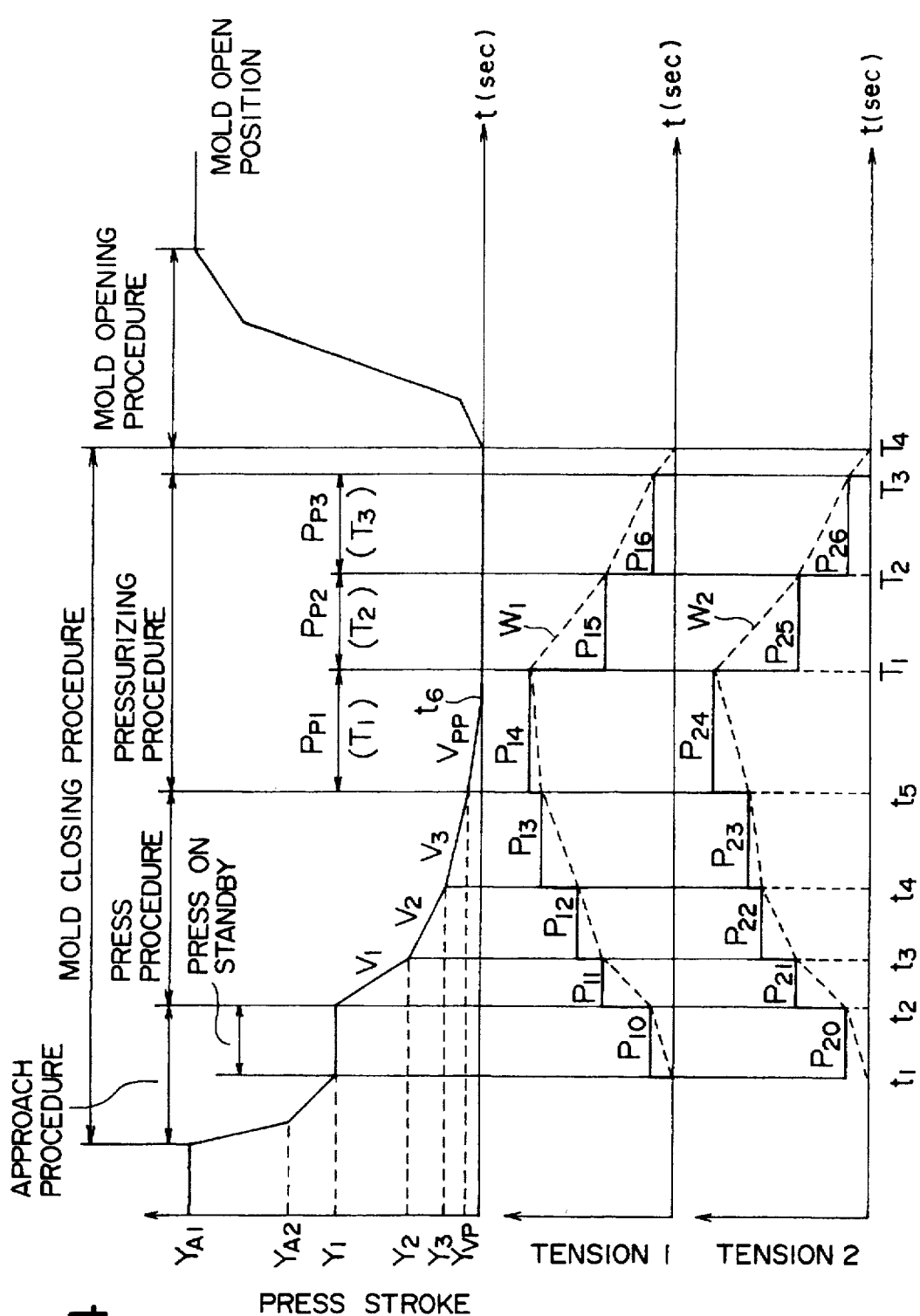
FIG. 4 is a time chart for the movable die plate and the tension on the sheet of skin material according to the first embodiment of the present invention.

The relationship between the movement of the movable die plate 22 and the holding force P of the sheet of skin material Mm during the injection and compression molding will now be explained while referring to FIG. 4.

The movable die plate 22 is shifted at high speed and at low speed from the mold fully open position $Y_{A1}$ to the predetermined position $Y_1$, and is halted at time $t_1$ where it goes on standby. At the predetermined position $Y_1$, or time $t_1$, the holding force program generator 50a receives a signal from the mold clamping controller 30. And upon the receipt of a signal from the holding force and position setting device 50b, the holding force program generator 50a outputs a command to the solenoid operated pressure proportion valves 45a and 45b to adjust the valves 45a and 45b to a predetermined pressure. The pressure acts on the cylinders 41a and 41b and a downwardly pressing force is exerted on the rods 42a and 42b. In response to the downwardly pressing force, the holding members 43a and 43b push the sheet of skin material Mm to the fixed metal mold 11, while the sheet of skin material Mm is held at one end by a predetermined holding force $P_{10}$, and at the other end by a predetermined holding force $P_{20}$.

The predetermined initial amount $U_p$ of the plastic material 200 is injected $u_p$ until time $t_2$. When the time reaches the time $t_2$, the solenoid operated directional control valve 24 is switched by the mold clamping controller 30, hydraulic oil in the variable pump 26 is discharged into the mold clamping cylinders 23a and 23b, and the movable metal mold 21 is driven downwardly at the operating speed $V_1$ At this time, the holding force program generator 50b receives a signal from the mold clamping controller 30. And upon the receipt of a signal from the holding force and position setting device 50a, the holding force program generator 50b outputs a command to the solenoid pressure proportion valves 45a and 45b to adjust them to a predetermined pressure. The force exerted by the holding members 43a and 43b is applied to the sheet of skin material Mm, with the force at one end of the sheet of skin material Mm being changed to a specific holding force $P_{11}$ and the force at the other end being changed to a specific holding force $P_{21}$. Thus, due to a predetermined tension, i.e., the friction between the holding members 43a and 43b and the fixed metal mold 11, a tension of $\alpha P_{11}$ is applied to one end of the sheet of skin material Mm and a tension of $\alpha P_{21}$ is applied to the other end.

When the movable metal mold 21 is moved further downwardly and reaches the mold clamp position $Y_2$, the position sensor 31 detects it and transmits a signal to the mold clamping controller 30. The mold clamping controller 30 changes the discharge volume of the variable pump 26 to move the movable metal mold 21 downwardly at the operating speed $V_2$. At this time, while the holding force program generator 50a receives a signal from the mold clamping controller 30, the holding force program generator 50a receives a signal from the holding force and position setting device 50b and outputs a command to the solenoid operated pressure proportion valves 45a and 45b. Then, in the same manner as is described above, the holding forces for the sheet of skin material Mm are changed to $P_{12}$ and $P_{22}$ while the tension $\alpha P_{12}$ is applied to one end of the sheet of skin material Mm and the tension $\alpha P_{22}$ is applied to the other end. Similarly, such control is continued until time ($t_3$ through $t_5$) for the press procedure.

Next, during the pressurizing procedure, when the movable metal mold 21 moves downwardly and reaches the mold clamp position $Y_{VP}$, the position sensor 31 detects it and transmits a signal to the mold clamping controller 30. The mold clamping controller 30 further reduces the discharge volume of the variable pump 26 and also outputs a command to the solenoid operated pressure proportion valve 25 to exert and maintain pressure $P_{p1}$ at the mold clamping cylinders 23a and 23b. At this time, the reduction in the discharge volume of the variable pump 26 decreases the energy and prevents a rise in temperature.

The holding force program generator 50a not only receives a signal from the mold clamping controller 30, but also a signal from the holding force and position setting device 50b. Upon the receipt of the signal from the holding force and position setting device 50b, the generator 50a outputs a command to the solenoid operated pressure proportion valves 45a and 45b and changes the holding forces for the sheet of skin material Mm to $P_{14}$ and $P_{24}$. After the sheet of skin material and the plastic material 200 are pressed against each other under the pressure $P_{p1}$ for the predetermined time $T_1$, program control is then shifted to the following pressure $P_{p2}$, and the holding forces for the sheet of skin material Mm are changed to $P_{15}$ and $P_{25}$, with which the sheet of skin material is pressed for the predetermined time $T_2$. When the given pressurizing procedure has been performed in order, the solenoid operated directional control valve 24 is switched by the mold clamping controller 30, the movable metal mold 21 is elevated, and a laminate-molded product is extracted. As is described above, when the pressure $P_{pn}$, the holding force of the sheet of skin material Mm, and the injection amount of the plastic material 200 are selected as needed, damage to and the puckering of the sheet of skin material Mm can be prevented. Although the application of the several tension values in FIG. 4 is represented by the solid line, as being performed as series of steps, it can be performed as a gradually varying process such as is illustrated by the ramp-like shapes that are delineated by dotted lines $w_1$ and $w_2$.

A second embodiment of the present invention will now be described with reference to FIG. 5. The same reference numbers as are used in the first embodiment are also used to denote corresponding or identical components and no explanation for them will be given.

A skin material holding device 60 includes holding members 63a and 63b, which directly hold edges of the sheet of skin material Mm which lies between the rods 62a and 62b of the cylinders 61a and 61b that are provided for a fixed die plate 12 of a mold clamping device 3; a pump 64, which supplies pressure to the cylinders 61a and 61b; solenoid operated pressure reduction valves 65a and 65b, which set the pressure for the fluid that is discharged from the cylinders 61a and 61b and which control the holding force for the sheet of skin material Mm; a solenoid operated directional control valve 66, which selects an oil feeding route to the cylinder 61a or 61b so as to change the operation of the cylinders 61a and 61b; and an oil tank 27.

Since the operation in this embodiment is almost the same as that in the first embodiment, only those aspects in which it differs from the first embodiment will be explained while referring to FIGS. 3 and 4.

A holding force program generator 50a of a skin material holding controller 50 receives a signal $Y_1$ from the mold clamping controller 30 and a signal $t_1$ from a holding force and position setting device 50b. Upon the receipt of the signal from the holding force setting device 50b, the holding force program generator 50a outputs a command to the solenoid operated pressure reduction valves 65a and 65b, and the sheet of skin material Mm is held at one end by a specific holding force $P_{10}$ and at the other end by a specific holding force $P_{20}$, which is equal to the holding force $P_{10}$. An initial amount $U_p$ of the plastic material 200 is injected during a time period ($t_1-t_2$). At time $t_2$, the solenoid operated directional control valve 24 is switched by the mold clamping controller 30, the hydraulic oil in a variable pump 26 is discharged to the mold clamping cylinders 23a and 23b, the movable metal mold 21 is moved downwardly at the operating speed $V_1$, and drawing begins while the movable metal mold 21 is in contact with the sheet of skin material Mm.

At this time, the holding force program generator 50a receives a signal from the mold clamping controller 30 and also a signal from the holding force and position setting device 50b. Upon the receipt of the signal from the holding force and position setting device 50b, the generator 50a outputs a command to the solenoid operated directional control valve 66 and the solenoid operated pressure reduction valves 65a and 65b, so that the solenoid operated directional control valve 66 is changed from its neutral position to a conductive position and so that the adjusted pressure at the solenoid operated pressure reduction valves 65a and 65b is changed to a given holding force $P_{11}$ at one end and a given holding force $P_{21}$ at the other end. The solenoid operated pressure reduction valves 65a and 65b are driven as the movable metal mold 21 descends, and provide a predetermined tension for the sheet of skin material Mm. The given holding forces $P_{11}$ and $P_{21}$ at this time are so set as to provide the optimal tension that is consonant with the shape, etc., of the product. The holding forces $P_{11}$ and $P_{21}$ can be the same or different. In the following procedures, as well as the solenoid operated pressure proportion valves 45a and 45b, the solenoid operated pressure reduction valves 65a and 65b are controlled to change the tension. In this embodiment, since the tension is applied directly to the sheet of skin material Mm, the accuracy is further enhanced.

Figure 6:
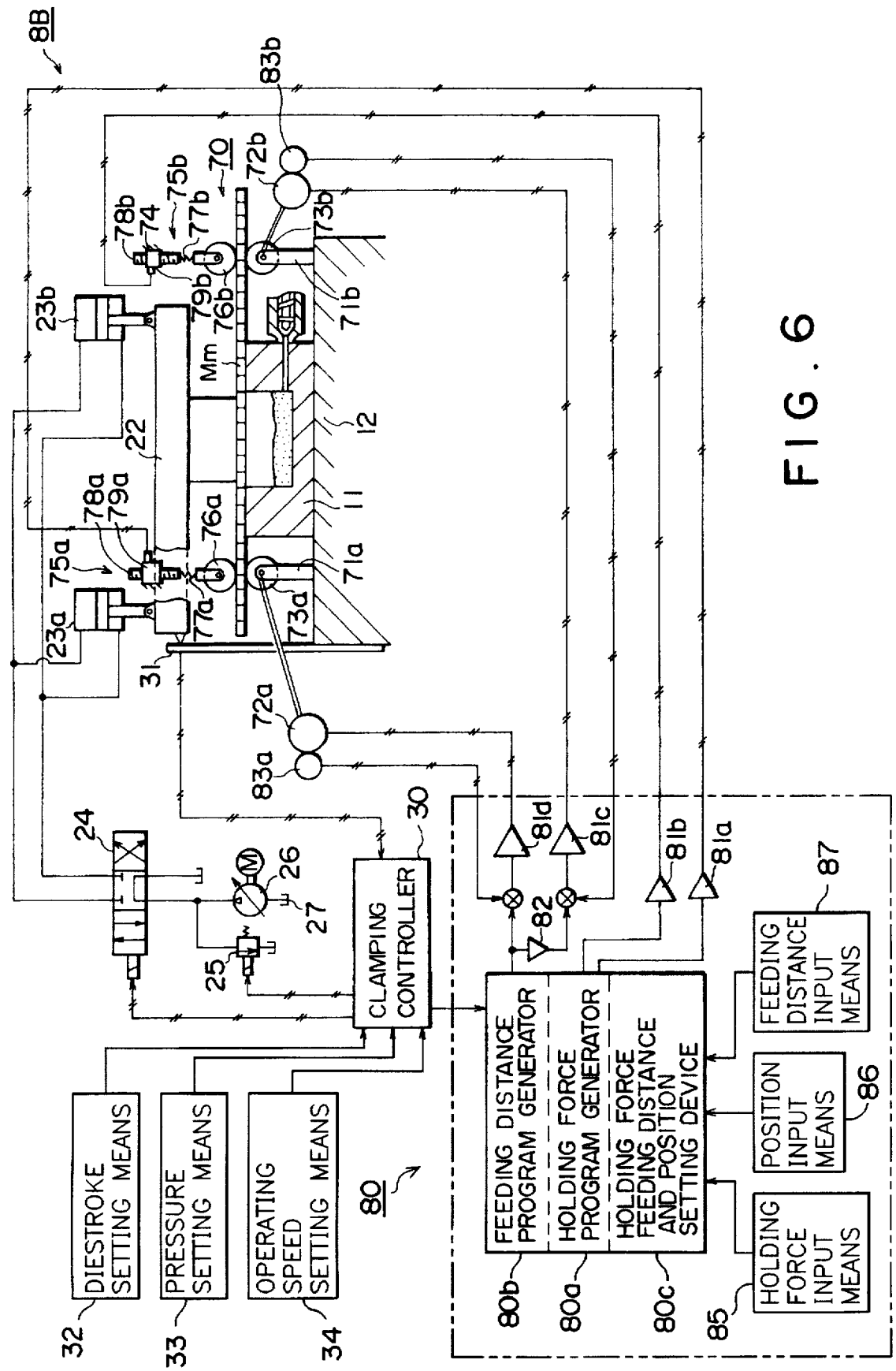
FIG. 6 is a diagram for explaining an injection molding machine and a laminate-molding apparatus according to a third embodiment of the present invention.
Figure 7:
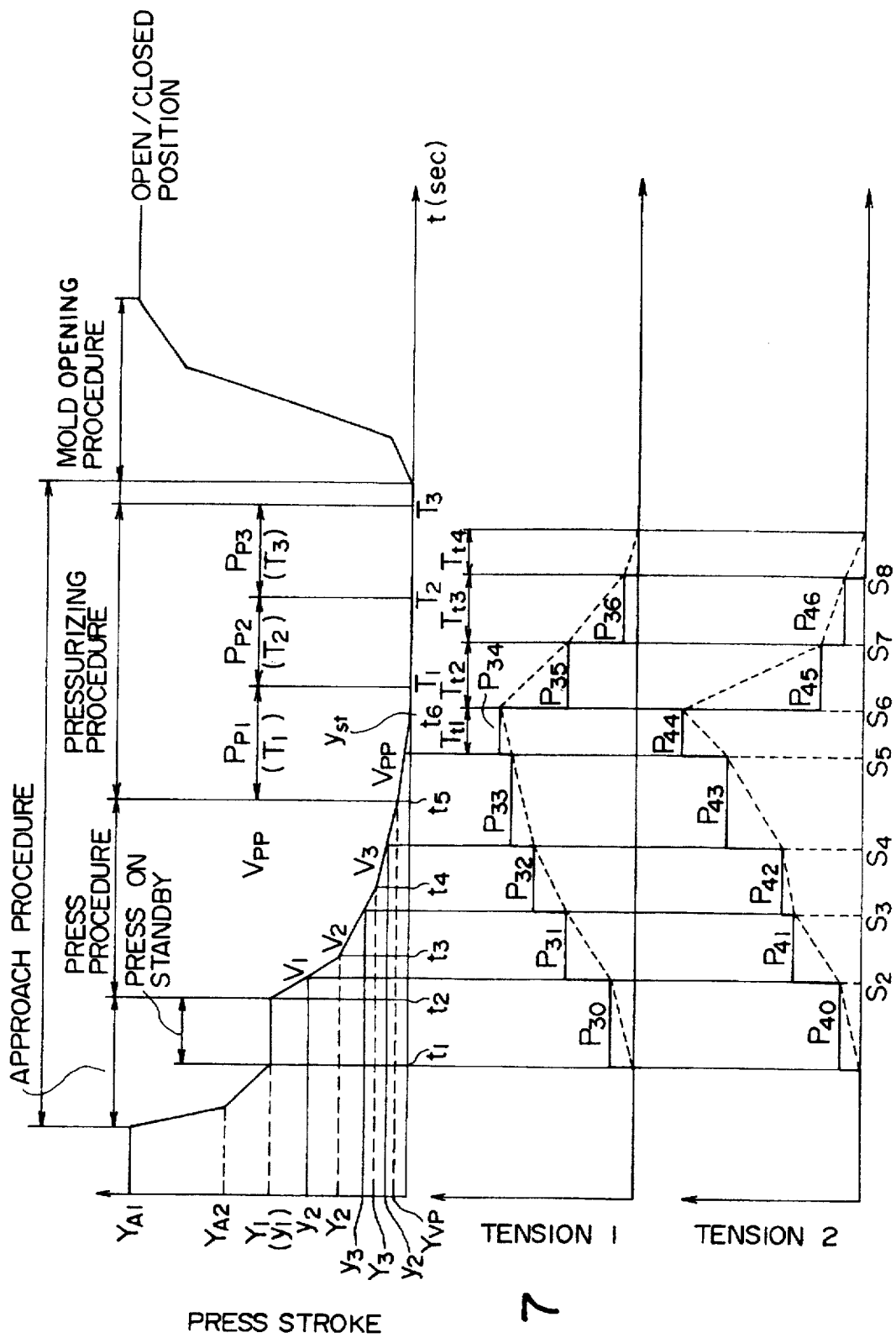
FIG. 7 is a time chart for the movable die plate and the tension on the sheet of skin material according to the third embodiment of the present invention.

A third embodiment of the present invention will now be explained while referring to FIGS. 6 and 7. The same reference numbers as are used in the first embodiment are also used to denote corresponding and identical components, and no explanation for them will be given.

A laminate-molding apparatus 8B has a skin material holding and feeding unit (hereafter referred to as a "skin material holding and feeding unit") 70 and a skin material holding controller 80.

The skin material holding and feeding unit 70 is held by feed rollers 73a and 73b, which are supported respectively by brackets 71a and 71b that are provided on a fixed die plate 12 and that are driven by motors 72a and 72b, and holding roller elements 75a and 75b, which are attached to a support wall 74 that continues upwardly from the fixed die plate 12, etc. The holding roller elements 75a and 75b respectively incorporate holding rollers 76a and 76b, which apply the variable holding force; springs 77a and 77b, which urge the holding rollers 76a and 76b; ball screws 78a and 78b, which vary the clamping loads on the springs 77a and 77b; and servo motors 79a and 79b, which move the ball screws 78a and 78b.

A skin material holding controller 80 includes a holding force program generator 80a; a feeding distance program generator 80b for the sheet of skin material Mm; a setting device 80c for the holding force, a feeding distance and a position for the sheet of skin material Mm; amplifiers 81a, 81b, 81c and 81d, which amplify a command that is outputted; a signal inverter 82, which permits the motor 72b to receive a command for a distance to be fed in a direction that is opposite to the rotation of the motor 72a; and pulse generators 83a and 83b, which detect rotation angles (feeding distances) of the motors 72a and 72b. Holding force input means 85 for inputting a holding force, position input means 86 for inputting data for a die stroke (position) or a time, and feeding distance input means 87 for inputting a feeding distance are also provided. The skin material holding controller 80 receives a command from the mold clamping controller 30. Then, upon the receipt of a signal from the setting device 80c for a holding force, a feeding distance and a position, the skin material holding controller 80 outputs a command from the holding force program generator 80a to the servo motors 79a and 79b via the amplifiers 81a and 81b. In addition, the feeding distance program generator 80b outputs a command via the amplifiers 81c and 81d to the motors 72b and 72a.

The operation for this embodiment will now be described. First, as in the first embodiment, in consonance with the shape of the product, the operating speed V for the movable metal mold 21 during the press procedure is inputted to the mold clamping controller 30 by a flow rate setting means 34, the altered position Y or the time t for the operating speed is inputted by the die stroke setting means 32, and the pressure $P_p$ during the pressurizing procedure is inputted by the pressure setting means 33. At this time, the relationship between the operating speed V of the movable metal mold 21, the altered position Y for the operating speed, and the injection volume is also inputted to the mold clamping controller 30.

In addition, the holding force P for the sheet of skin material Mm, which is consonant with the shape of the product, is inputted by the holding force input means 85 to the setting device 80c for a changed position for the holding force and a feeding distance; the changed position y or the time Sn for the holding force is inputted by the position input means 86, which inputs a die stroke (position); and the feeding distance for the sheet of skin material Mm is inputted by the feeding distance input means 87. In the above described press procedure, an example is shown where the changed position Y of the operating speed does not correspond to the changed position y for the holding force.

The relationship between the stroke position of the movable die plate 22 and the tension P, and the feeding distance for the sheet of skin material Mm at the time of injection and compression molding will be explained. In FIG. 7 the stroke position and the tension P of the sheet of skin material Mm are shown. The movable die plate 22 is shifted from the metal mold fully open position $Y_{A1}$ to the predetermined position $Y_1$ at a high speed and a low speed, and is halted at time ti whereat the die plate 22 goes on standby. At the predetermined position $Y_1$ and time $t_1$, the holding force program generator 80a receives a signal from the mold clamping controller 30, while it receives a signal from the holding force, feeding distance and position setting device 80c and outputs a command to the servo motors 79a and 79b via the amplifiers 81a and 81b. The servo motors 79a and 79b rotate the ball screws 78a and 78b to urge forward the springs 77a and 77b, respectively. As a result, the clamping loads on the springs 77a and 77b become variable, and the sheet of skin material Mm is held by the rollers 76a and 76b, with a predetermined holding force $P_{30}$ at one end and with a predetermined holding force $P_{40}$ at the other end.

The given initial amount $U_p$ of plastic material 200 is injected during the period ($t_1$ to $t_2$). At time $t_2$, the solenoid operated directional control valve 24 is switched by the mold clamping controller 30, hydraulic oil in the variable pump 26 is discharged into the mold clamping cylinders 23a and 23b, the movable metal mold 21 is moved downwardly at the operating speed $V_1$, and, to feed the sheet of skin material Mm, the feeding distance program generator 80b outputs commands for a predetermined feeding distance at a predetermined feeding speed (e.g., given motor rotational speed $\beta V_1$) to the motors 72a and 72b via the amplifiers 81d and 81c. When the pulse generators 83a and 83b indicate a predetermined feeding distance $x_1$, the motors 72a and 72b are halted. Through this process, the sheet of skin material Mm is driven into the cavity of the fixed metal mold 11 by the movable metal mold 21 at the operating speed $V_1$. In addition, while the sheet of skin material Mm is held by the holding rollers 76a and 76b, it is fed the predetermined feeding distance $x_1$ toward the movable metal mold 21 and the fixed metal mold 11 at the given feeding speed $\beta V_1$ ($\beta$ being 1 or smaller) by the supply rollers 73a and 73b, which are driven by the motors 72a and 72b.

At this time, at the specific position $Y_2$ or the time $S_2$, as the movable die plate 22 is driving the movable metal mold 21 into the cavity of the fixed metal mold 11 at the operating speed $V_1$, the holding force program generator 80a not only receives a signal from the mold clamping controller 30, but also a signal from the holding force, feeding distance and position setting device 80c, and outputs a command to the servo motors 79a and 79b to urge forward the springs 77a and 77b. As a result, the holding force at one end of the sheet of skin material Mm is changed to the given holding force $P_{31}$, and the holding force at the other end is changed to the given holding force $P_{41}$. Since a stronger holding force is applied to the sheet of skin material Mm, it can be fed into the cavity of the fixed metal mold 11 and will not be fed loosely into even a deep cavity metal mold.

When the movable metal mold 21 is moved further downwardly and reaches the mold clamping position $Y_2$, the position sensor 31 detects it and transmits a signal to the mold clamping controller 30. In response to that signal, the mold clamping controller 30 changes the volume that the variable pump 26 discharges, and moves the movable metal mold 21 downwardly at operating speed $V_2$, which is slower than $V_1$. As a result, the sheet of skin material Mm will not be driven suddenly by the movable metal mold 21, and can be fed into the cavity of the fixed metal mold 11 without being stretched, even if it is fed into a deeper cavity metal mold. At this time, to feed the sheet of skin material Mm, the feeding distance program generator 80b outputs a command for a predetermined feeding distance $x_2$ at a given feeding speed (e.g., at predetermined motor rotational speed $\beta V_2$) to the motors 72a and 72b via the amplifiers 81d and 81c.

Further, at a specific position $Y_3$ or a time $S_3$, as the movable die plate 22 is driving the movable metal mold 21 into the cavity of the fixed metal mold 11 at the operating speed $V_2$, the pressing force of the rollers 76a and 76b is altered to change the holding force at one end of the sheet of skin material Mm to a given holding force $P_{32}$ and to change the holding force at the other end to a given holding force $P_{42}$.

In the same manner, the pressing procedure is performed until the movable metal mold 21 reaches the mold clamping position $Y_{vp}$. Then, the pressurizing procedure is begun. When the movable metal mold 21 has descended and reached the mold clamping position $Y_{vp}$, the position sensor 31 detects it and transmits a signal to the mold clamping controller 30. The mold clamping controller 30 reduces the discharge volume of the variable pump 26, and outputs a command to the solenoid operated directional control valve 24 to apply a pressure $P_{p1}$ to the mold clamping cylinders 23a and 23b. During the pressurization with pressure $P_{p1}$, the movable metal mold 21 descends lower until it is halted at time $t_6$ by the cooling of the resin. The position $y_{st}$ of the movable metal mold 21 that is traveling (or time $S_5$) is detected by the position sensor 31. The pressing force at the rollers 76a and 76b is altered, and the holding force at one end of the sheet of skin material Mm is changed to a predetermined holding force $P_{34}$ and the holding force at the other end is changed to predetermined holding force $P_{44}$. At the same time, the holding force program generator 80a starts timer set-time $T_{t1}$. When the travel distance of the movable metal mold 21 due to the cooling of the resin is great, the sheet of skin material Mm can be fed by the supply rollers 73a and 73b, and when the travel distance is small, the material Mm may not be fed.

The rollers 76a and 76b are activated close to where the resin is further cooled and the movable metal mold 21 is halted at time $t_6$, with the holding force at one end being changed to a given lower holding force $P_{35}$ and the holding force at the other end being changed to a given lower holding force $P_{45}$.

After the sheet of skin material Mm and the plastic material 200 are pressed together under pressure $P_{p1}$ for predetermined time $T_1$, the pressure is shifted to the next pressure $P_{p2}$. When the timer set-time $T_{t1}$ has expired during this process, the next timer set-time $T_{t2}$ is started and the holding forces $P_{35}$ and $P_{45}$ for the sheet of skin material Mm are changed to holding forces $P_{36}$ and $P_{46}$, and the sheet of skin material Mm and the plastic material 200 are pressed together for the predetermined time $T_2$. As the given pressure is gradually reduced, and when the pressurizing procedure is terminated after predetermined time $T_3$ has elapsed, the mold clamping controller 30 changes the solenoid operated directional control valve 24, the movable metal mold 21 ascends and the laminate-molded product is removed. As is described above, as the pressure $P_{pn}$, the holding force $P_{mn}$ for the sheet of skin material Mm, and the feeding distance for the sheet of skin material Mm are properly selected, damage to and puckering of the sheet of skin material Mm can be prevented, and the adhesiveness can be improved.

Figure 8:
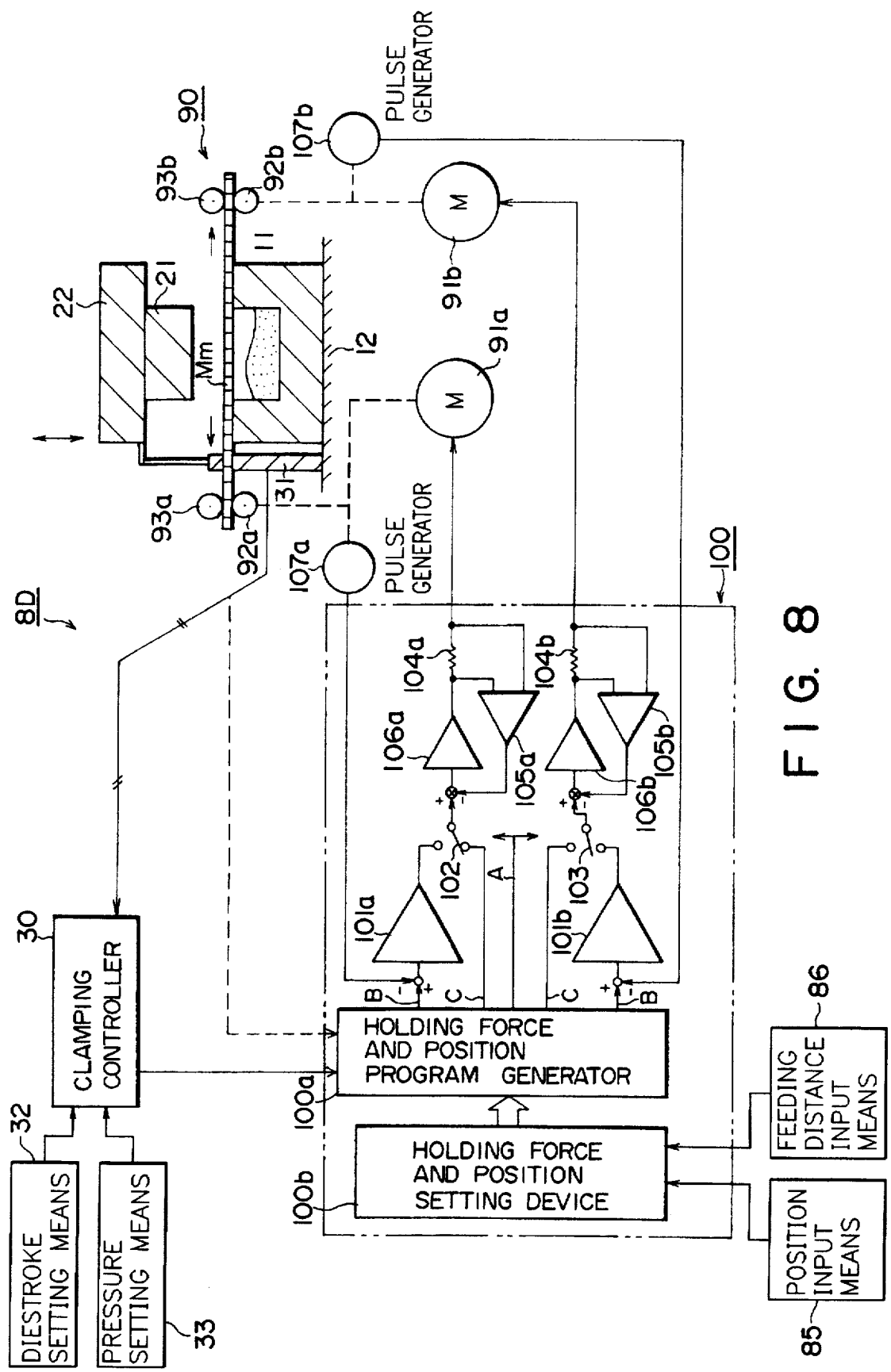
FIG. 8 is a diagram for explaining an injection molding machine and a laminate-molding apparatus according to a fourth embodiment of the present invention.

A fourth embodiment of the present invention will now be explained while referring to FIG. 8. The same reference numbers as are used in the third embodiment are also used to denote corresponding or identical components, and no explanation for them will be given.

A laminate-molding apparatus 8D comprises a skin material holding device 90 and a skin material holding controller 100. The skin material holding device 90 is supported by a bracket (not shown) that is attached to a fixed die plate 12, and includes feeding rollers 92a and 92b, which are driven by motors 91a and 91b, and holding rollers 93a and 93b, which are attached to the fixed fie plate 12. The feeding rollers 92a and 92b and the holding rollers 93a and 93b contact the sheet of skin material Mm and hold it with variable holding force by the rotation torques of the feeding rollers 92a and 92b.

The skin material holding controller 100 includes a program generator 100a for the holding force and the position of the sheet of skin material Mm; a holding force and position setting device 100b, which sets the variable holding force and the altered position for the sheet of skin material Mm; positioning amplifiers 101a and 101b for amplifying the positioning command output; switches 102 and 103, with which position command B or tension command C is selected according to a switching signal A; current detection resistors 104a and 104b of the motors 91a and 91b; current feedback amplifiers 105a and 105b; motor current amplifiers 106a and 106b; and pulse generators 107a and 107b, which detect rotational angles (feeding distances) of the motors 91a and 91b. In addition, a holding force input means 85 for inputting holding force, and a position input means 86 for inputting a die stroke (position) or a time are provided.

In the skin material holding controller 100, not only is a command received from the mold clamping controller 30, but also a signal is received from the holding force and position setting device 100b. Upon the receipt of these signals, the holding force and position program generator 100a outputs to the motors 91a and 91b via the motor current amplifiers 106a and 106b, respectively, a command for controlling the holding force.

The operation in this embodiment will now be described. Since the operation is almost the same as that in the third embodiment, only those aspects in which it differs from the third embodiment will be described while referring to FIG. 7.

To apply tension to the sheet of skin material Mm, the motors 91a and 91b are rotated in opposite directions to generate a torque. Since the torque Mt generated by the motors 91a and 91b is $$Mt=(\text{motor torque constant } Kt) \times (\text{motor current } Mi),$$

to simplify the explanation the tension applied to the sheet of skin material Mm is presumed to be equal to the motor current Mi.

The movable die plate 22 is moved from the metal mold fully open position $Y_{A1}$ to the given position $Y_1$ at a high speed and at a low speed, and is halted at time $T_1$, where the movable die plate 22 goes into the standby state. At the given position $Y_1$ or time $t_1$, the holding force and position program generator 100a receives a signal from the position sensor 31 and also a signal from the holding force and position setting device 100b, and changes the switches 102 and 103 according to the switching signal A. The holding force and position program generator 100a outputs a command for tension to the motors 91a and 91b via the motor current amplifiers 106a and 106b. Upon the receipt of the command, the motors 91a and 91b rotate the feeding rollers 92a and 92b in opposite directions. As the sheet of skin material Mm is held between the feeding rollers 92a and 92b and the holding rollers 93a and 93b, tension is acquired from the given holding force $P_{30}$ that is applied at one end and the holding force $P_{40}$ that is applied at the other end.

The given initial amount U of plastic material 200 is injected during the period ($t_1$ to $t_2$). At time $t_2$, the solenoid operated directional control valve 24 is switched by the mold clamping controller 30, hydraulic oil from the variable pump 26 is discharged into the mold clamping cylinders 23a and 23b, and the movable metal mold 21 is moved downwardly at the operating speed $V_1$. At this time, at the specific position $Y_2$ or the time $S_2$, as the movable die plate 22 is driving the movable metal mold 21 into the cavity of the fixed metal mold 11 at the operating speed $V_1$, the holding force program generator 100a outputs a tension command to the motors 91a and 91b via the motor current amplifiers 106a and 106b to provide holding force $P_{31}$ at one end and holding force $P_{41}$ at the other end.

While stronger tension is being applied to the sheet of skin material Mm by the movable metal mold 21 and the feeding rollers 92a and 92b, it is fed into the fixed metal mold 11 at the given operating speed $V_1$ without becoming loose.

When the movable metal mold 21 is moved down further and reaches the mold clamping position $Y_2$, the position sensor 31 detects it and transmits a signal to the mold clamping controller 30. In response to that signal, the mold clamping controller 30 changes the volume that the variable pump 26 discharges, and moves the movable metal mold 21 downwardly at the operating speed $V_2$, which is lower than $V_1$. As the result, the sheet of skin material Mm will not suddenly be pushed by the movable metal mold 21, and can be fed into the cavity of the fixed metal mold 11 without being stretched, even if it is fed into a deeper cavity metal mold.

At this time, at the specific position $y_3$ or the time $S_3$, as the movable die plate 22 is driving the movable metal mold 21 into the cavity of the fixed metal mold 11 at the operating speed $V_2$, the holding force and position program generator 100a outputs a tension command to the motors 91a and 91b via the motor current amplifiers 106a and 106b to change the holding force at one end of the sheet of skin material Mm to the given holding force $P_{32}$ and the holding force at the other end to the given holding force $P_{42}$.

In the same manner, the pressing procedure is performed until the mold clamping position $y_{st}$ is reached. When the pressurizing procedure is begun, the mold clamping controller 30 exercises control in the same manner as in the third embodiment. The holding force and position program generator 100a outputs a tension command to the motors 91a and 19b via the motor current amplifiers 106a and 106b, and alters the tension, as needed, depending on the feeding rollers 92a and 92b, even during the pressurizing procedure.

When the pressurizing procedure is terminated and a laminate-molded product is to be removed, the switches 102 and 103 are changed by the switching signal A from the holding force and position program generator 100a to accept a position command B. The holding force and position program generator 100a then outputs a command to the motors 91a and 91b via the positioning amplifiers 101a and 101b, switches 102 and 103, the motor current amplifiers 106a and 106b, and the resistors 104a and 104b, respectively, to reduce the tension on the sheet of skin material Mm. The motors 91a and 91b are rotated until the pulse generators 107a and 107b detect the position where the tension on the skin material Mm is reduced. When that position is detected, the motors 91a and 92b are halted and the product can be removed.

A fifth embodiment of the present invention will now be explained while referring to FIG. 9. The same reference numbers as are used in the first embodiment are also used to denote corresponding or identical components, and no explanation for them will be given here.

Figure 9:
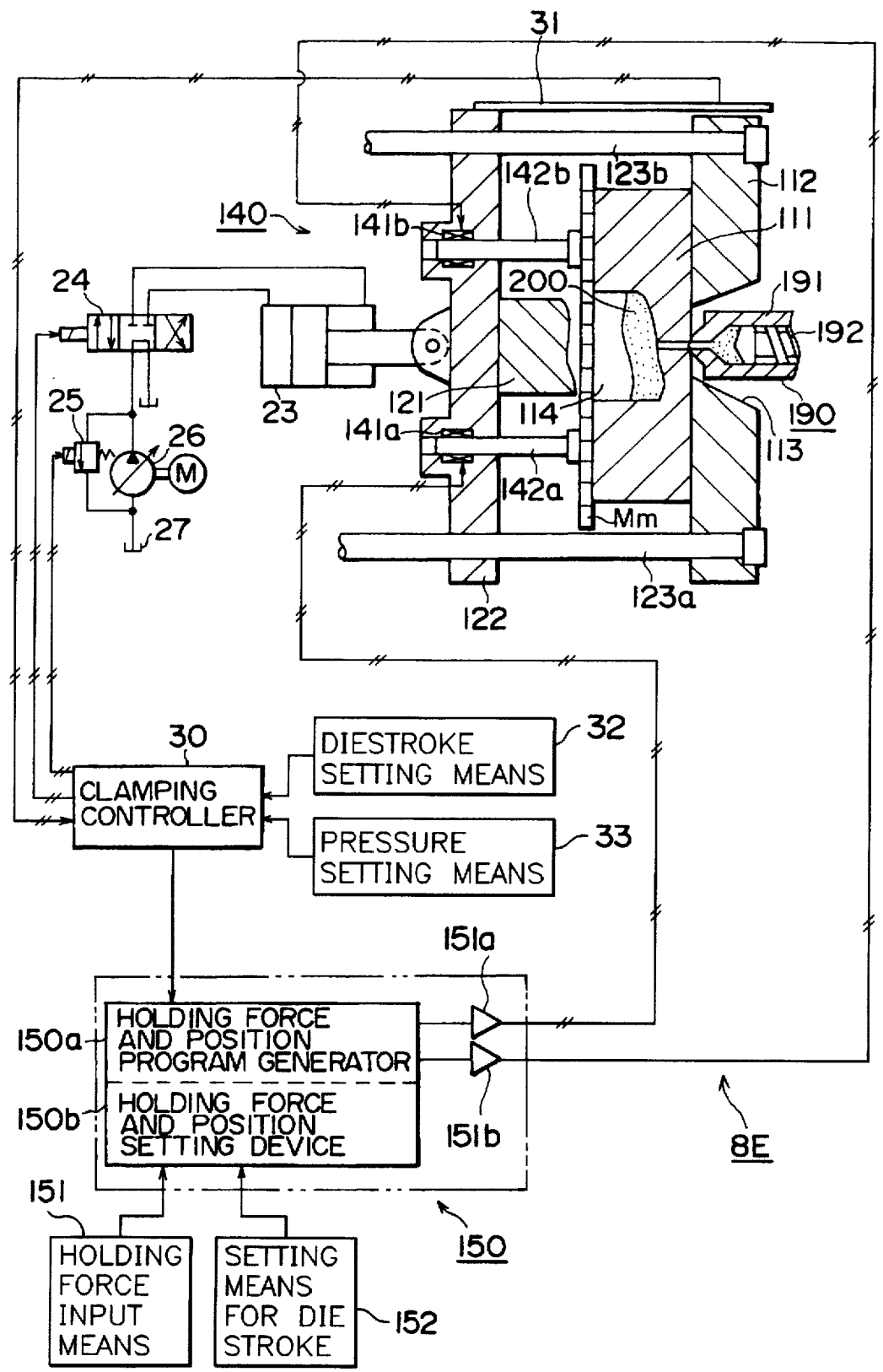
FIG. 9 is a diagram for explaining an injection molding machine and a laminate-molding apparatus according to a fifth embodiment of the present invention.

In FIG. 9, a fixed die plate 112, which supports a fixed metal mold 111, is fixed to the top end of a bed (not shown) of a horizontal type injection molding machine. A plurality of tie bars 123a and 123b, which so support a movable die plate 122 that it can slide freely for closing and opening, are fixed to the fixed die plate 112. The ends of the die bars 123a and 123b are slidably supported by a bracket that is fixed to one end of the bed (not shown).

The fixed metal mold 111 is attached to one side of the fixed die plate 112 and an injection cylinder device 190 is provided at the other side. The nozzle of an injection cylinder 191 abuts upon the fixed metal mold 111 through a hole 113 that is formed in the fixed die plate 112, and resin is injected into a cavity 114 by a screw element 192.

For the movable die plate 122, which slides freely along the die bars 123a and 123b, are provided a mold clamping cylinder 23, which drives the movable die plate 122 at the time of mold clamping; a solenoid operated directional control valve 24 for supplying hydraulic fluid to the mold clamping cylinder 23, and a pressure proportion valve 25 for varying the force of the pressure that is applied to the resin, both of which are actuated in response to a command from the mold clamping controller 30; a variable pump 26, which serves as a hydraulic oil supply source; and an oil tank 27. The movable die plate 122 is coupled with the fixed die plate 112 by a hydraulic cylinder (not shown) that rapidly closes and opens the movable die plate 122. A position sensor 31 is also provided.

A laminate-molding apparatus 8E comprises a skin material holding device 140 and a skin material holding controller 150. The skin material holding device 140 has coils 141a and 141b, which are attached to the movable die plate 122; and plungers 142a and 142b, which are provided slidably through the respective coils 141a and 141b and supported slidably by the movable die plate 122, and press against the sheet of skin material Mm.

The skin material holding controller 150 includes a holding force and position program generator 150a; a holding force and position setting device 150b, which sets a variable holding force for the sheet of skin material Mm; amplifiers 151a and 151b, which amplifies the command output; holding force input means 151, which inputs holding force; and setting means 152 for inputting a die stroke (position). The skin material controller 150 receives a command from a mold clamping controller 30, which receives a signal from a die stroke setting means 32, or from pressure setting means 33, and a signal from the position sensor 31 and which outputs a command to a variable pump 26 via the solenoid operated pressure proportion valve 25. In addition, upon the receipt of a signal from the holding force and position setting device 150b, the holding force and position program generator 150a outputs a command to the coils 141a and 141b via the amplifiers 151a and 151b.

The relationship between the injection of the plastic material 200 from the injecting cylinder device 190 and the operation of the movable die plate 122 at the time of injection and compression molding is the same as that in the first embodiment, and no explanation of it will be given. Further, as for the operational relationship between the movable die plate 122 and the holding force P for the sheet of skin material Mm at the time of injection and compression molding, since the solenoid operated pressure proportion valves 45a and 45b in the first embodiment are simply replaced with the coils 141a and 141b that receive signals from the holding force and position program generator 150a, no explanation of that relation will be given.

Figure 10:
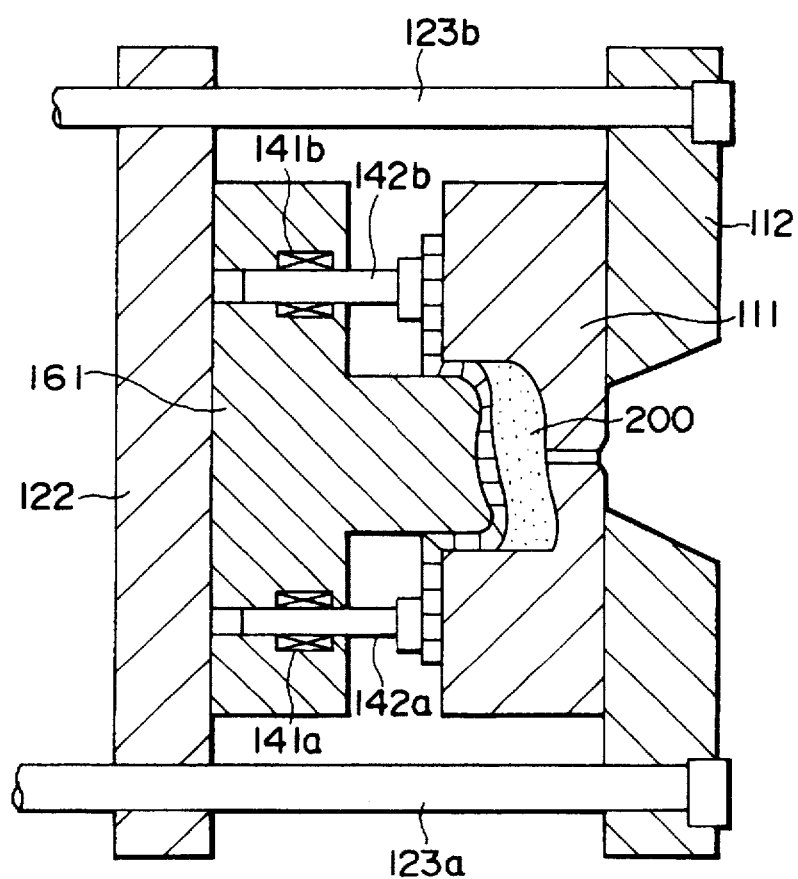
FIG. 10 is a cross-sectional view of an injection molding machine and the movable metal mold of a laminate-molding apparatus according to a sixth embodiment of the present invention.

FIG. 10 is a diagram illustrating a sixth embodiment of the present invention. In this embodiment, the coils 141a and 141b shown in FIG. 9 for the fifth embodiment are attached to a movable metal mold 161. Since the other arrangements in this embodiment are the same as those in the fifth embodiment, an explanation for them will not be given.

The arrangement of the holding elements will be explained while referring to FIGS. 11A through 11C.

Figure 11A:
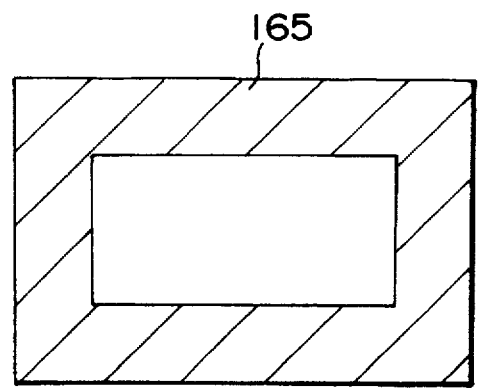
FIGS. 11A through 11C are diagrams for explaining the arrangement of holding elements.
Figure 11B:
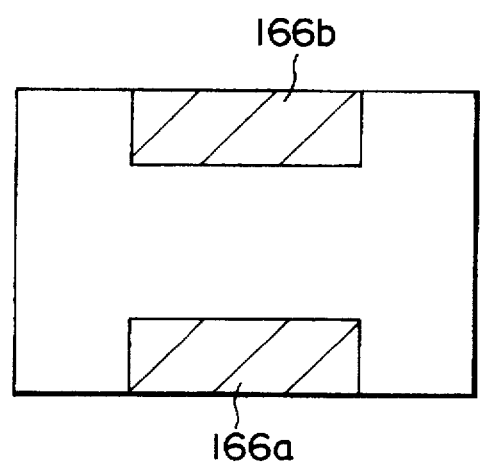
Figure 11C:
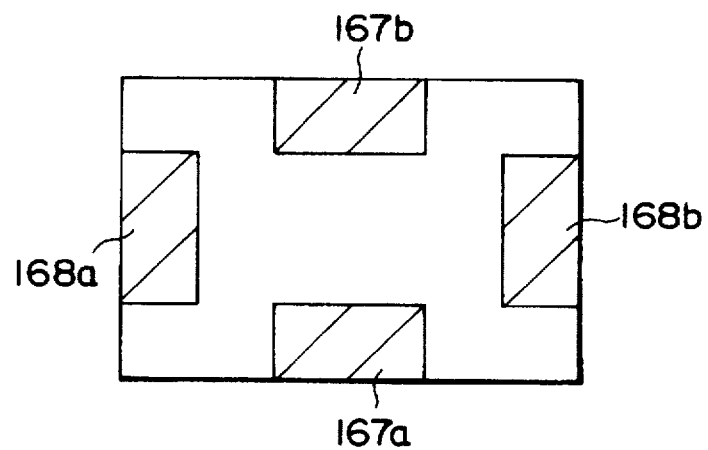

In FIG. 11A is shown an example arrangement with a holding element 165 of an integrally formed frame; in FIG. 11B is shown an example where two holding elements 166a and 166b are arranged on opposite edge portions; and in FIG. 11C is shown an example where four holding elements 167a and 167b, and 168a and 168b are arranged on opposite edge portions faces. The arrangement of the holding elements is not limited to the above described examples, and a plurality of holding elements can be arranged in consonance with a shape and can be controlled independently.

According to the first through the sixth embodiments, the holding element of an integrally formed frame, or a holding device that has two or more holding elements, is provided on the molding machine side or on the metal mold side. The holding force of the holding element, or the tension that acts on the sheet of skin material Mm is independently controlled, in multiple steps or varied sequentially, in consonance with the shape, material, drawability, and thickness of the product. Therefore, laminate-molding can be performed without any partial tearing or puckering, even for a complicated molded product, and the quality of the external appearance is improved.

A seventh embodiment of the present invention will now be explained while referring to FIGS. 12 through 14.

Figure 12:
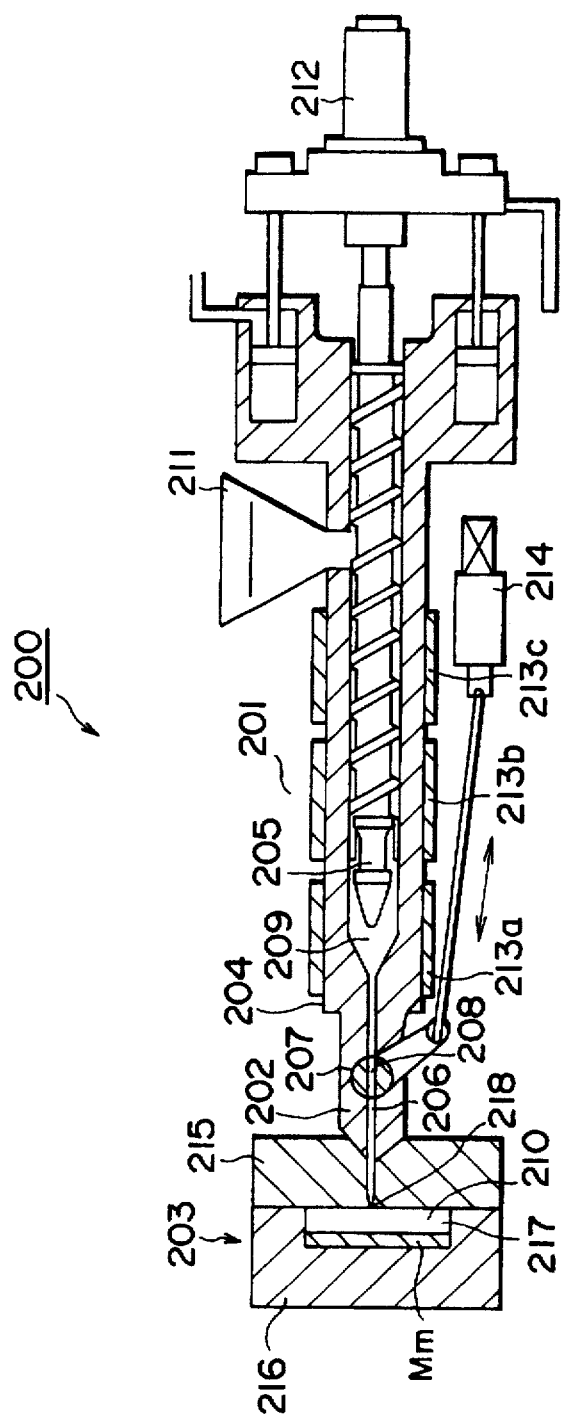
FIG. 12 is a cross-sectional view of an injection molding machine according to a seventh embodiment of the present invention.
Figure 13:
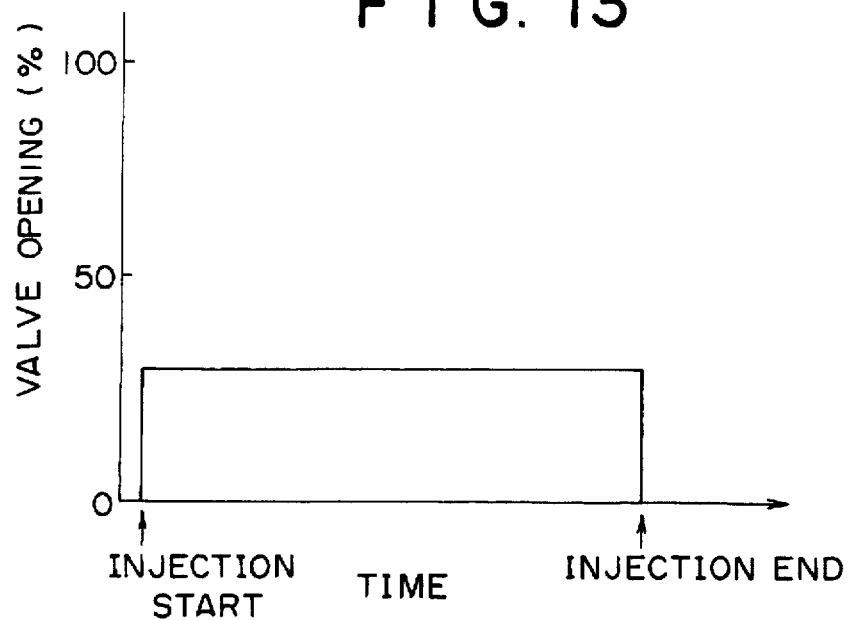
FIG. 13 is a graph for the opening of the valve during an injection procedure according to the seventh embodiment of the present invention.

An injection molding machine 200 shown in FIG. 12 is an in-line screw type with a mold clamping force of 55 t., and has an injection molding unit 201 and a metal mold 203 that is connected to a nozzle portion 202 of the unit 201.

In the upper portion of a cylinder 204, which is provided for the injection molding unit 201, is located a hopper 211 to supply to the cylinder 204 material that consists of resin and a foaming agent. A screw 205 that mixes the material and injects it is located inside the cylinder 204. The nozzle portion 202 is provided at the distal end of the cylinder 204, and at the rear end is provided a screw rotation motor 212 that rotates the screw 205 and at the same time drives it from side to side with its drive controller (not shown). On the external surface of the cylinder 204, between the nozzle portion 202 and the hopper 211, are located cylinder heaters 213a, 213b and 213c, the temperatures of which are independently controlled in order to melt the solid material that is supplied from the hopper 211 to the cylinder 204. A flow path is formed in the nozzle portion 202 in order to supply the melted resin from the cylinder 204 to the metal mold 203. A rotary valve 207 is located in the middle portion, which generates shear heat due to flow path resistance. By opening a valve opening adjustment portion 208 of the rotary valve 207 to provide a predetermined valve opening, the cross-section of the flow path 206 is controlled. The valve opening adjustment portion 208 is controlled by an electric servo motor 214.

A metal mold 203 consists of a fixed metal mold 215 and a movable metal mold 216, which together define a cavity 217. The nozzle portion 202 is connected to the metal mold 203, and melted resin 209 that is melted in the cylinder 204, flows along the flow path 206 via the rotary valve 207 and is injected from the gate 218 into the metal mold 203 and fills it.

Figure 17:
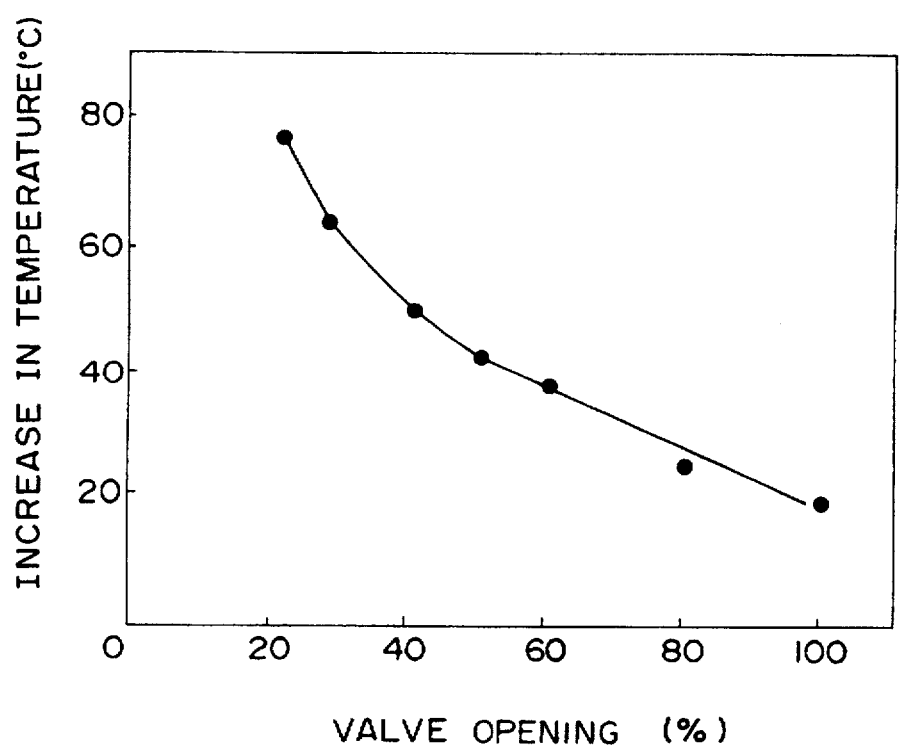
FIG. 17 is a graph showing the valve opening and the temperature rise due to shear heat generated in consonance with the valve opening.

The operation of this embodiment will now be described. In this embodiment, after the sheet of skin material Mm is placed in the metal mold 203, the valve opening is adjusted to that at which the foaming agent will attain the thermal decomposition temperature or higher during the injection procedure, so that the shear heat that is due to the rotary valve 207 in the nozzle portion 202 can be employed to heat melted resin 210 between the cylinder 204 and the metal mold 203. The control of the valve opening during the injection procedure is shown in FIG. 13, and the relationship in the injection molding machine 200 between the valve opening and the increase in temperature that is due to shear heat generation by the rotary valve 207 is shown in FIG. 17.

PP (polypropylene) resin, with which ADCA (azo dicarboamido) foaming agent of 5 phr is mixed, is fed through the hopper 211. The temperature for the thermal decomposition of the ADCA foaming agent is 200° C. The mixed resin that has been fed is heated by the cylinder heaters 213a, 213b and 213c and its temperature is increased due to shear heat generation as the screw 205 rotates. Since the temperature of the melted resin 210 is controlled at 170° C. forward of the screw 205, the resin is in the non-foamed state even though it is melted.

Then, the melted resin 210 is injected by the screw 205. At this time, the valve opening adjustment portion 208 is set to permit a valve opening of 30%, i.e., the cross-section of the flow path 206 is reduced to 30%. The temperature of the melted resin 209 is thus increased about 60° C. due to shear heating when it passes through, and reaches a temperature of about 230° C., which is equal to or higher than that required for thermal decomposition, so that the resin begins to foam as it is injected through the gate 218.

The melted resin 210 that has begun to foam is injected and fills the cavity 217, which is defined by the movable metal mold 216 and the fixed metal mold 215, and wherein the sheet of skin material Mm is placed internally in advance. The sheet of skin material Mm is a lamination sheet that consists of a PVC (polyvinyl chloride) resin sheet, which serves as a surface after the molding procedure, and a polyolefin foamed sheet. Although the melted resin 210 is injected into the cavity 217 and has begun to foam, it is rapidly cooled by the internal walls of the metal mold 203, which is maintained at a temperature that is sufficiently lower than the melting point of the mixed resin. The resin 210 therefore becomes solidified in an almost non-foamed state and forms a skin layer. The melted resin 210 that is in contact with the sheet of skin material Mm is also cooled essentially rapidly, so that as the resin 210 forms a skin layer in the slightly foamed state, it securely adheres to the sheet of skin material Mm. The melted resin 210 in the cavity 219 is fully foamed and solidified because the cooling speed is low, and forms a core. The foaming pressure that is internally generated prevents sink marks on the skin layer, which are due to the compression of the resin at the time of cooling, and provides a lightweight core that is fully foamed.

Figure 14:
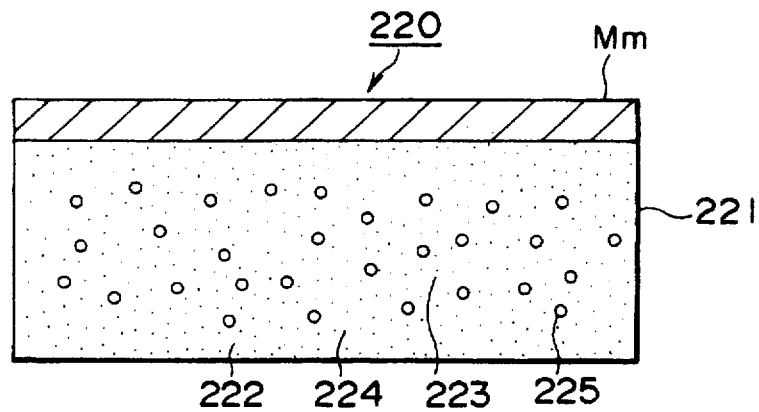
FIG. 14 is a cross-sectional view of a foamed body with laminated skin material according to the seventh embodiment of the present invention.

FIG. 14 is a cross-section of the foamed product, with skin, that is obtained in this embodiment. The sheet of skin material Mm of a foamed product with skin maintains the high grade surface quality of a PVC resin sheet, which forms the obverse face of the sheet, and is securely and perfectly affixed to the resin substrate 221. The resin substrate 221 has, in its external area, a skin layer 222 that is delicate and sufficiently strong, and in its internal area, a core 223 that is highly foamed. The skin layer 222 has a few tiny pores 224 and the core 223 has multiple large pores 225. Because of this core 223, the resin substrate 221 is extremely lightweight and the total foamed product with skin is also lightweight.

Figure 15:
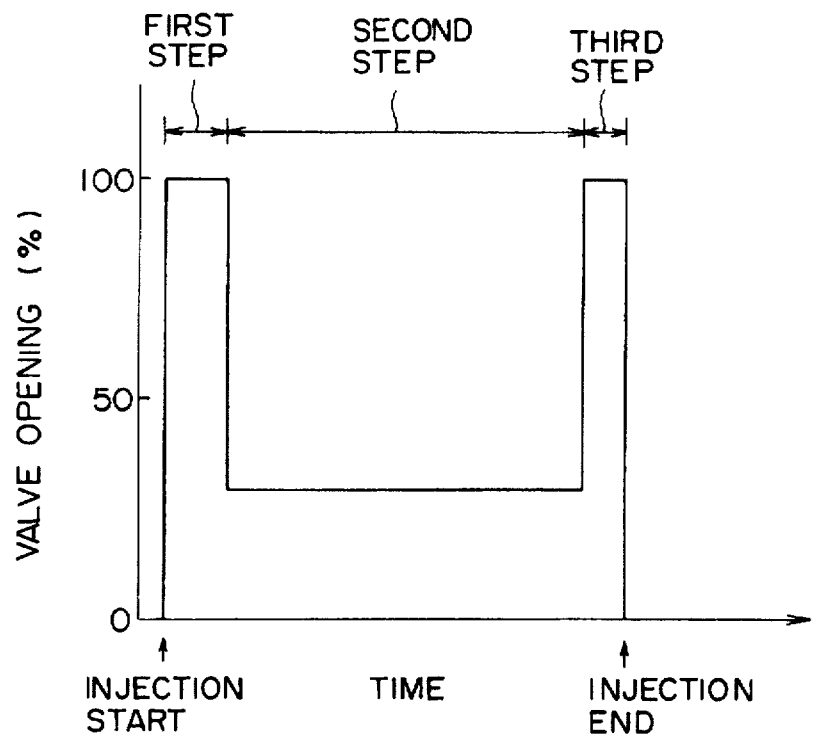
FIG. 15 is a graph showing the opening of the valve according to an eighth embodiment of the present invention.

An eighth embodiment of the present invention will now be described while referring to FIGS. 15 to 17.

In this embodiment, the heating at the injection procedure in the seventh embodiment is controlled in three steps, and only at the second heating step is the resin heated to a temperature that is equal to or higher than the thermal decomposition temperature for the foaming agent.

First, the sheet of skin material Mm is placed in a metal mold 203 which is then closed. The temperature in the cylinder 204 is increased by the cylinder heaters 203a, 203b and 203c and by the shear heating of the resin, which is mixed with a foaming agent, that is generated as the screw 205 rotates. The resin 210 is adjusted so that it is at 170° C. and is in a non-foamed state, even though at this temperature it is melted.

Then, the melted resin 210 is injected by the screw 205. At the first step, when the injection begins, the valve opening adjustment portion 208 is shifted instantaneously from a position that provides a valve opening of 0% to one that provides a valve opening of 100%. When the melted resin 210 is passed through a rotary valve at a valve opening of 100%, its temperature is increased about 20° C. (see FIG. 17) by shear heating. However, as its temperature is 190° C., which is equal to or lower than the temperature for the thermal decomposition of the foaming agent, the resin is therefore injected in the non-foamed state through the gate 218 and into the cavity 217. At the second step, the valve opening is instantaneously changed from 100% to 30%, so that the temperature of the melted resin 210 when it passes through is increased about 60° C. due to the shear heating, and a temperature of about 230° is obtained, which is equal to or higher than the thermal decomposition temperature. The melted resin 210 has thus begun to foam as it is injected into the cavity 217. At the third step, the valve opening is changed instantaneously from 30% to 100%, so that the melted resin 210 which is then injected into the cavity 217 through the gate 218 is in the non-foamed state.

Figure 16:
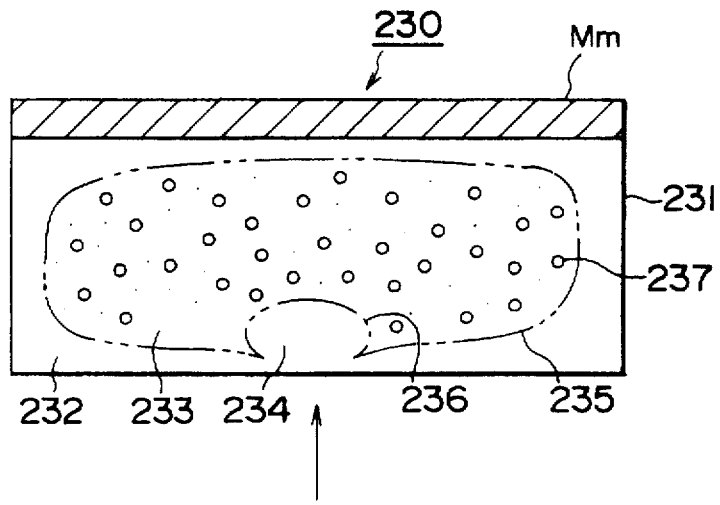
FIG. 16 is a cross-sectional view of a foamed body with laminated skin material according to the eighth embodiment of the present invention.

FIG. 16 is a cross-section of the foamed product with skin that is acquired by this injection molding method. A resin substrate 231 of a foamed product 230 with skin has a skin layer 232, which is obtained by injecting the non-foamed resin at the first step and solidifying it; a core 233, which is obtained by injecting the foamed resin at the second step and solidifying it; and a skin layer 234, which is obtained by injecting the non-foamed resin at the third step and solidifying it. Although the resin substrate 231 is an integrally formed product that has no border lines, in order to easily understand this, the imaginary border line between the skin layer 234 and the core 233 is indicated by a chain double-dashed line 235, and the imaginary border line between the core 233 and the skin layer 234 is indicated by a chain double-dashed line 236. The injection from the gate 218 is indicated by the arrow line.

In this embodiment as well as in the previous embodiment, the sheet of skin material Mm maintains a high grade surface quality of PVC type resin sheet, which is the obverse side of the sheet, and is securely and perfectly affixed to the resin substrate 231. Since the skin layer 222 of the resin substrate 221 has not been foamed, there are no pores and also no sink marks that are due to the foaming pressure of the core 233. In addition, as the skin layer 232 has an adjusted, given thickness, it is very strong. The core 233 is preferably foamed and many large pores 237 exist. The skin layer 234 that is obtained by injecting and solidifying the resin at the third step has no pores and provides an external appearance of an excellent quality. The thus molded product has a surface of an excellent quality and is very strong and lightweight.

Figure 18:
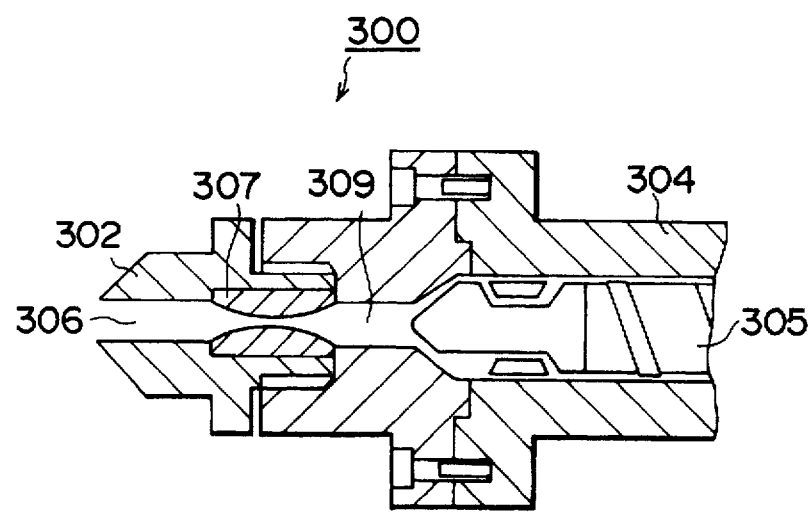
FIG. 18 is a cross-sectional view of the essential portion of an injection molding machine according to a ninth embodiment of the present invention.

A ninth embodiment of the present invention will now be explained while referring to FIG. 18.

The difference between an injection molding machine 300 in this embodiment and the injection molding machine 200 in the seventh embodiment is that a fixed type flow path resistor 307 is provided as the shear heat generation means.

A nozzle portion 302, which is inserted into and fixed to the distal end of the cylinder 304, internally has a fixed type flow path resistor 307. The cross-section of the flow path resistor 307 is small and is set to provide a predetermined temperature increase, for example, 60° C., for the injection molding machine 300. In the operation in this embodiment, melted resin 309 that has an adjusted temperature of 170°, which is equal to or lower than the thermal decomposition temperature for a foaming agent, is injected by the screw 305. When the resin 309 is passed through the fixed flow path resistor 307, the temperature of the resin 309 is increased to 230° C. due to the generation of shear heat. As a result, as the foaming of the resin 309 is begun, the resin 309 is injected through the flow path 306 into a cavity (not shown). The thus molded product in this embodiment, as well as in the seventh embodiment, has an external appearance of excellent quality and is lightweight, and its skin material securely adheres to the resin substrate. This embodiment can be applied for a common injection molding machine that has no rotary valve. As a method for controlling the temperature in multiple steps, a combination of adjustments of the injection pressure and of the screw speed can control the increase in the temperature, which is caused by passing the resin 309 through the fixed flow path resistor 307.

Figure 19:
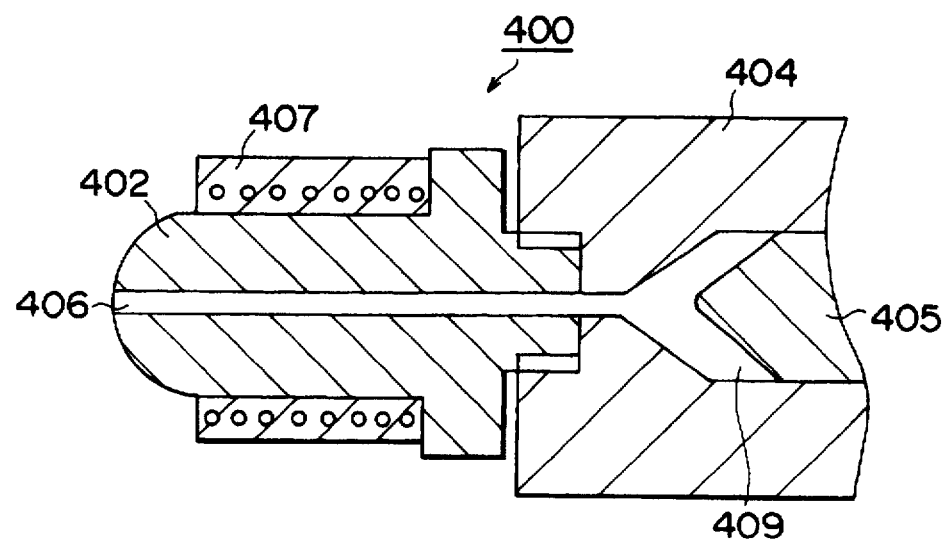
FIG. 19 is a cross-sectional view of the essential portion of an injection molding machine according to a tenth embodiment of the present invention.

A tenth embodiment of the present invention will now be described while referring to FIG. 19.

The difference between this embodiment and the ninth embodiment is the heating means. More specifically, a nozzle portion 402, which is inserted into the distal end of the cylinder 404 of the injection molding machine 400 in this embodiment, has an external electric resistance heating element 407. Melted resin 409 has an adjusted temperature that is at or below the thermal decomposition temperature for a foaming agent, e.g., 190° C. When such resin 409 is passed through a flow path 406, it is heated by the electric resistance heating element 407, and is injected by the screw 405 into a cavity (not shown) while the foaming has begun. The control of the temperature in multiple steps can be performed by a combination of adjustments to control the injection pressure and the screw speed, as in the ninth embodiment. The heating means in this embodiment can be replaced with an ultrasonic heating device.

Of course, the skin material, the resin and the foaming agent are not limited to those employed in the above described embodiments. Any material that is ordinarily employed for injection molding or foaming and injection molding can be used as needed. Although the injection molding machine has been described as the apparatus of the present invention, the present invention can be applied to an injection compression molding machine and a compression molding machine that have the same molding functions.

In addition, at the injection procedure, the heating between the cylinder and the metal molds has been performed in three steps, and in one of the steps the heating is performed at the thermal decomposition temperature of a foaming agent or higher. When, for example, the shape of a product is complicated, heating in more steps can be employed; and in two or more of the steps or in all of the steps, the heating can be performed at or above the thermal decomposition temperature for a foaming agent. Further, the heating temperatures in the two or more steps can be different, so that a core in a resin substrate has differently foamed degrees.

INDUSTRIAL USABILITY OF THE INVENTION

The present invention is effective as a laminate-molded product manufacturing method and apparatus for manufacturing laminate-molded products, such as interior items for lightweight cars, that have an external appearance of an excellent quality.

What is claimed is:

1. A method for manufacturing a laminate-molded product, comprising the steps of:

positioning a sheet of skin material between a first mold and a second mold, one of said first mold and said second mold having a mold cavity, holding the thus positioned sheet of skin material under tension, moving said second mold toward said first mold and inserting a portion of the thus held sheet of skin material into said mold cavity, varying the tension on the thus held sheet of skin material as said portion of the thus held sheet of skin material is inserted into said mold cavity, infecting melted resin into said mold cavity and into contact with said portion of the thus held sheet of skin material, and solidifying the thus injected melted resin so as to form a molded article which is a laminate of said portion of said sheet of skin material and the thus solidified resin;

wherein said step of varying the tension comprises changing said tension in consonance with a speed at which said portion of the thus held sheet of skin material is inserted into said mold cavity.

2. A method in accordance with claim 1, wherein said step of moving said second mold toward said first mold comprises moving said second mold toward said first mold at a high speed from a first predetermined position to a second predetermined position and then at a lower speed from said second predetermined position to a third predetermined position, such that at said third predetermined position said second mold is positioned near said thus held sheet of skin material.

3. A method for manufacturing a laminate-molded product, comprising the steps of:

positioning a sheet of skin material between a first mold and a second mold, one of said first mold and said second mold having a mold cavity, holding the thus positioned sheet of skin material under tension, moving said second mold toward said first mold and inserting a portion of the thus held sheet of skin material into said mold cavity, varying the tension on the thus held sheet of skin material as said portion of the thus held sheet of skin material is inserted into said mold cavity, injecting melted resin into said mold cavity and into contact with said portion of the thus held sheet of skin material, and solidifying the thus injected melted resin so as to form a molded article which is a laminate of said portion of said sheet of skin material and the thus solidified resin;

wherein said step of varying the tension comprises changing said tension in consonance with a speed at which said portion of the thus held sheet of skin material is inserted into said mold cavity;

wherein said step of moving said second mold toward said first mold comprises moving said second mold toward said first mold at a high speed from a first predetermined position to a second predetermined position and then at a lower speed from said second predetermined position to a third predetermined position, such that at said third predetermined position said second mold is positioned near said thus held sheet of skin material;

wherein said second mold is held at said third predetermined position while said step of injecting melted resin is initiated and an initial quantity of said melted resin is injected into said mold cavity.

4. A method in accordance with claim 3, wherein, after said initial quantity of said melted resin has been injected into said mold cavity, said step of moving said second mold further comprises moving said second mold from said third predetermined position to a mold closed position so that said second mold contacts said portion of said thus held sheet of skin material and inserts said portion of said thus held sheet of skin material into said mold cavity while the step of injecting said melted resin into said mold cavity is being completed.

5. A method in accordance with claim 4, wherein said sheet of skin material is a woven fabric, a nonwoven fabric, a thermoplastic resin sheet or film, or a thermoplastic elastomer sheet or film.

6. A method for manufacturing a laminate-molded product, comprising the steps of:

positioning a sheet of skin material between a first mold and a second mold, one of said first mold and said second mold having a mold cavity, holding the thus positioned sheet of skin material under tension, moving said second mold toward said first mold and inserting a portion of the thus held sheet of skin material into said mold cavity, varying the tension on the thus held sheet of skin material as said portion of the thus held sheet of skin material is inserted into said mold cavity, injecting melted resin into said mold cavity and into contact with said portion of the thus held sheet of skin material, and solidifying the thus injected melted resin so as to form a molded article which is a laminate of said portion of said sheet of skin material and the thus solidified resin;

wherein said step of moving said second mold toward said first mold comprises moving said second mold from a first predetermined position to a second predetermined position;

wherein said second mold is held at said second predetermined position while said step of injecting a melted resin is initiated and an initial quantity of said melted resin is injected into said mold cavity; and wherein, after said initial quantity of said melted resin has been injected into said mold cavity, said step of moving said second mold toward said first mold further comprises moving said second mold from said second predetermined position to a mold closed position as said portion of the thus held sheet of skin material is inserted into said mold cavity and said step of injecting said melted resin into said mold cavity is completed.

7. A method in accordance with claim 6, wherein said sheet of skin material is a woven fabric, a nonwoven fabric, a thermoplastic resin sheet or film, or a thermoplastic elastomer sheet or film.

8. A method in accordance with claim 6, wherein said sheet of skin material is held at at least two points outwardly of said portion of sheet of-skin material, and wherein said step of varying the tension comprises matching the tension on said sheet of skin material at each of said points.

9. Apparatus for manufacturing a laminate-molded product, comprising:
   a mold clamping device;
   a first mold and a second mold that are attached to said clamping device, one of said first and second molds having a mold cavity;
   a skin material holding unit for applying tension to a sheet of skin material positioned between said first mold and said second mold;
   a detector for detecting when said first and second molds are clamped by said mold clamping device and for providing a signal representative thereof;
   means for moving said second mold toward said first mold, after said first and second molds are clamped by said mold clamping device, so as to insert a portion of said sheet of skin material into said mold cavity;
   an injection device for injecting melted resin into said mold cavity and into contact with said portion of the thus tensioned sheet of skin material; and
   a skin material holding controller for receiving said signal from said detector and, upon receipt of said signal from said detector, outputting to said skin material holding unit a command to change a tension that is applied to said sheet of skin material as said portion of said sheet of skin material is inserted into said mold cavity.

10. Apparatus in accordance with claim 9, wherein said skin material holding unit comprises an integral frame which holds edge portions of said sheet of skin material.

11. Apparatus in accordance with claim 9, wherein a holding element of said skin material holding unit is provided on each of at least one of a plurality of edge portions of said sheet of skin material.

12. Apparatus in accordance with claim 9, wherein said skin material holding unit comprises a plurality of holding elements, and wherein said skin material holding controller independently controls said plurality of holding elements.

13. Apparatus in accordance with claim 9, wherein said skin material holding unit comprises a skin material holding and feeding unit which holds said sheet of skin material and which feeds said sheet of skin material toward said mold cavity, and wherein said skin material holding controller applies a feeding speed command to said skin material holding and feeding unit to feed said sheet of skin material toward said mold cavity at a predetermined speed which is consonant with a speed at which said portion of said sheet of skin material is inserted into said mold cavity.

14. Apparatus in accordance with claim 13, wherein said skin material holding and feeding unit comprises a plurality of holding elements, and wherein said skin material holding controller independently controls said plurality of holding elements.

15. Apparatus in accordance with claim 13, wherein said skin material holding and feeding unit comprises a plurality of holding elements, and wherein each of said plurality of holding elements provides tension for said sheet of skin material by exerting a compression force on said sheet of skin material.

16. Apparatus in accordance with claim 13, wherein said skin material holding and feeding unit comprises a plurality of holding elements, and wherein each of plurality of holding elements provides tension for said sheet of skin material by directly holding said sheet of skin material.

17. Apparatus in accordance with claim 13, wherein said skin material holding controller comprises a holding force program generator; a feeding distance program generator; and a holding force, feeding distance, and position setting device.

18. Apparatus in accordance with claim 9, wherein said skin material holding controller comprises a holding force program generator and a holding force and position setting device.

19. Apparatus in accordance with claim 18, wherein said holding force and position setting device is provided with a holding force input and a position input; and wherein said detector comprises a mold clamping controller for controlling the movement of said second mold with respect to said first mold, and a position sensor for indicating to said clamping controller a position of said second mold with respect to said first mold, wherein said mold clamping controller provides said signal to said skin material holding controller.

20. Apparatus in accordance with claim 9, wherein said mold cavity is in said first mold, further comprising at least one holding element for holding said sheet of skin material against said first mold, and at least one mechanism for positioning said at least one holding element, wherein said skin material holding controller controls said at least one mechanism to change the tension on said sheet of skin material.

21. Apparatus in accordance with claim 20, wherein each said holding element comprises a holding roller and a drive roller which are pressed against opposite surfaces of said sheet of skin material; and wherein said skin material holding controller comprises a holding force program generator for controlling the position of each holding roller, a feeding distance program generator for controlling the position of each drive roller; and a holding force, feeding distance, and position setting device.

22. A method for manufacturing a laminate-molded product, comprising the steps of:
   positioning a sheet of skin material between a first mold and a second mold, one of said first mold and said second mold having a mold cavity,
   providing in a cylinder of an injection device a mixture of a melted core resin and a foaming agent at a first temperature in a non-foamed state, said foaming agent having a thermal decomposition temperature, said first temperature being lower than said thermal decomposition temperature of said foaming agent,
   clamping said first mold and said second mold with at least a portion of the thus positioned sheet of skin material being exposed to said mold cavity,
   passing a first portion of said mixture from said cylinder through a heating element in which said first portion of said mixture is heated to a second temperature which is higher than said first temperature and lower than said thermal decomposition temperature of said foaming agent,
   injecting said first portion of said mixture, having said second temperature and being in a non-foaming state, into said mold cavity and into contact with said portion of said sheet of skin material,
   solidifying the resin of the thus injected first portion of said mixture so as to form a first non-foamed skin layer which is bonded to said sheet of skin material,
   passing a second portion of said mixture from said cylinder through said heating element in which said second portion is heated to a third temperature which is higher than said thermal decomposition temperature of said foaming agent, injecting said second portion, having said third temperature and being in a foaming state, into said mold cavity and into contact with said first portion of said mixture, solidifying the resin of the thus injected second portion so as to form a foamed core which is bonded to said non-foamed skin layer, passing a third portion of said mixture from said cylinder through said heating element in which said third portion is heated to a fourth temperature which is higher than said first temperature and lower than said thermal decomposition temperature of said foaming agent, injecting said third portion, having said fourth temperature and being in a non-foaming state, into said mold cavity and into contact with said foamed core, and solidifying the resin of the thus injected third portion so as to form a second non-foamed skin layer which is bonded to said foamed core in order to form a molded article which is a laminate of said portion of said sheet of skin material and the thus solidified resin of said first, second, and third portions.

23. A method in accordance with claim 22, wherein said sheet of skin material is a woven fabric, a nonwoven fabric, a thermoplastic resin sheet or film, or a thermoplastic elastomer sheet or film.

24. A method in accordance with claim 22, wherein said heating element comprises a shear heat generator.

25. A method in accordance with claim 24, wherein said shear heat generator comprises a rotary valve having a variable valve opening.

26. A method in accordance with claim 22, wherein said heating element comprises an electrical resistance heating element.

27. A method in accordance with claim 22, wherein said heating element comprises an ultrasonic heater.

28. A method in accordance with claim 22, wherein said heating element comprises a melted resin flow path resistance element.

29. A method for manufacturing a laminate-molded product, comprising the steps, in any suitable order, of:

positioning a sheet of skin material between a first mold and a second mold, one of said first mold and said second mold having a mold cavity, clamping said first mold and said second mold with at least a portion of the thus positioned sheet of skin material being exposed to said mold cavity, providing a mixture of a core resin and a foaming agent, said core resin having a melting temperature, said foaming agent having a thermal decomposition temperature which is higher than said melting temperature, heating a first portion of said mixture to a first temperature which is higher than said melting temperature of said core resin and lower than said thermal decomposition temperature of said foaming agent, injecting said first portion, having said first temperature and being in a non-foaming state, into said mold cavity and into contact with said portion of said sheet of skin material, solidifying the resin of the thus injected first portion so as to form a first non-foamed skin layer which is bonded to said sheet of skin material, heating a second portion of said mixture to a second temperature which is higher than said thermal decomposition temperature of said foaming agent, injecting said second portion, having said second temperature and being in a foaming state, into said mold cavity and into contact with said first portion, solidifying the resin of the thus injected second portion so as to form a foamed core which is bonded to said non-foamed skin layer, heating a third portion of said mixture to a third temperature which is higher than said melting temperature of said core resin and lower than said thermal decomposition temperature of said foaming agent, injecting said third portion, having said third temperature and being in a non-foaming state, into said mold cavity and into contact with said foamed core, and solidifying the resin of the thus injected third portion so as to form a second non-foamed skin layer which is bonded to said foamed core in order to form a molded article which is a laminate of said portion of said sheet of skin material and the thus solidified resin of said first, second, and third portions.

* * * * *